United States Patent
Grip et al.

(10) Patent No.: US 9,555,871 B2
(45) Date of Patent: Jan. 31, 2017

(54) TWO-SURFACE SANDWICH STRUCTURE FOR ACCOMMODATING IN-PLANE EXPANSION OF ONE OF THE SURFACES RELATIVE TO THE OPPOSING SURFACE

(75) Inventors: Robert E. Grip, Rancho Palos Verdes, CA (US); John J. Brown, Costa Mesa, CA (US)

(73) Assignee: The Boeing Company, Chicago, IL (US)

(*) Notice: Subject to any disclaimer, the term of this patent is extended or adjusted under 35 U.S.C. 154(b) by 888 days.

(21) Appl. No.: 13/412,593

(22) Filed: Mar. 5, 2012

(65) Prior Publication Data
US 2013/0227952 A1    Sep. 5, 2013

(51) Int. Cl.
| F02K 1/82 | (2006.01) |
| F02K 1/80 | (2006.01) |
| B64C 1/12 | (2006.01) |
| B64D 29/06 | (2006.01) |
| B64D 27/26 | (2006.01) |
| B64D 29/00 | (2006.01) |
| F01D 25/26 | (2006.01) |
| F01D 25/30 | (2006.01) |
| F04D 29/44 | (2006.01) |

(52) U.S. Cl.
CPC ............... *B64C 1/12* (2013.01); *B64D 27/26* (2013.01); *B64D 29/00* (2013.01); *F01D 25/26* (2013.01); *F01D 25/30* (2013.01); *B64D 29/06* (2013.01); *F02K 1/80* (2013.01); *F02K 1/82* (2013.01); *F04D 29/441* (2013.01); *F05D 2250/40* (2013.01); *Y02T 50/672* (2013.01); *Y10T 29/49229* (2015.01); *Y10T 428/249923* (2015.04)

(58) Field of Classification Search
CPC .......... F04D 29/441; F01D 25/26; F02K 1/80; F02K 1/82; B64C 1/12; B64D 29/06
USPC ........... 60/796–799, 39.5, 770, 771; 415/200
See application file for complete search history.

(56) References Cited

U.S. PATENT DOCUMENTS

| 787,065 A | * | 4/1905 | White | F41H 5/04 109/79 |
| 1,855,161 A | * | 4/1932 | Wyman | D21J 1/16 428/182 |
| 2,833,587 A | * | 5/1958 | Saunders | 296/20 |

(Continued)

FOREIGN PATENT DOCUMENTS

| GB | 2046193 | 11/1980 |
| GB | 2226088 | 6/1990 |
| GB | 2242711 | 10/1991 |

OTHER PUBLICATIONS

Extended European Search Report for PCT 13156842.0, dated Dec. 20, 2013.

(Continued)

*Primary Examiner* — Lorne Meade
*Assistant Examiner* — Eric Linderman

(57) ABSTRACT

A sandwich structure includes a first skin, a second skin, a first hinge member, and a second hinge member. The first hinge member may be movably coupled to the first skin and a first skin joint. The second hinge member may be movably coupled to the second skin and second skin joint. The first hinge member and the second member may be movably coupled to one another and a member joint located between the first and second skin joint.

23 Claims, 33 Drawing Sheets

(56) References Cited

U.S. PATENT DOCUMENTS

| | | | | |
|---|---|---|---|---|
| 3,542,152 A * | 11/1970 | Oxx, Jr. | B64D 33/02 181/214 |
| 3,623,494 A * | 11/1971 | Poucher | F02C 7/042 137/15.2 |
| 3,698,668 A * | 10/1972 | Cole | B64C 3/48 244/219 |
| 3,716,209 A * | 2/1973 | Pierce | B64C 3/48 244/123.1 |
| 4,012,013 A * | 3/1977 | Ball | B64C 3/48 137/15.1 |
| 4,220,171 A * | 9/1980 | Ruehr | B64D 33/02 137/15.1 |
| 4,259,825 A * | 4/1981 | Frosch | E04H 12/18 52/645 |
| 4,351,502 A * | 9/1982 | Statkus | B64C 3/48 244/214 |
| 4,579,302 A * | 4/1986 | Schneider | B64G 9/00 136/292 |
| 4,617,072 A * | 10/1986 | Merz | B32B 3/20 156/89.25 |
| 4,637,192 A * | 1/1987 | Brown | E04H 12/18 428/12 |
| 4,976,110 A | 12/1990 | Reid | |
| 5,082,424 A * | 1/1992 | Husain et al. | 416/158 |
| 5,125,206 A * | 6/1992 | Motohashi | B64G 9/00 52/646 |
| 5,163,262 A * | 11/1992 | Adams | B64G 9/00 52/111 |
| 5,330,092 A * | 7/1994 | Gregg | B21D 26/055 228/157 |
| 5,484,105 A * | 1/1996 | Ausdenmoore et al. | 239/127.3 |
| 5,715,644 A * | 2/1998 | Yasui | B21D 47/00 228/157 |
| 5,887,828 A * | 3/1999 | Appa | B64C 3/48 244/215 |
| 5,971,328 A * | 10/1999 | Kota | B63B 1/248 244/219 |
| 5,974,979 A * | 11/1999 | Grady | A47B 3/087 108/123 |
| 6,010,098 A * | 1/2000 | Campanile | B64C 3/48 244/219 |
| 6,042,055 A | 3/2000 | Messinger | |
| 6,082,676 A | 7/2000 | Cochran | |
| 7,048,229 B2 * | 5/2006 | Sanders | F02C 7/042 137/15.1 |
| 7,607,617 B2 * | 10/2009 | Law | B64C 3/18 244/219 |
| 7,739,865 B2 * | 6/2010 | Prasad | B64D 33/02 137/15.1 |
| 7,743,763 B2 | 6/2010 | Grip | |
| 7,775,049 B2 * | 8/2010 | Kumar et al. | 60/796 |
| 7,891,608 B2 | 2/2011 | Rawdon | |
| 7,963,039 B2 * | 6/2011 | Burnett et al. | 29/897.32 |
| 8,056,865 B2 * | 11/2011 | Grip | B64C 3/48 244/201 |
| 8,069,511 B1 * | 12/2011 | DiMucci | 5/611 |
| 8,262,032 B2 * | 9/2012 | Sanderson | B64C 3/185 244/123.5 |
| 8,342,444 B2 * | 1/2013 | Hartshorn et al. | 244/54 |
| 8,353,476 B2 * | 1/2013 | Crook et al. | 244/54 |
| 8,382,045 B2 * | 2/2013 | Manley | B64C 9/16 244/213 |
| 8,402,739 B2 * | 3/2013 | Jain | F04D 27/0253 137/15.1 |
| 8,544,240 B2 * | 10/2013 | Hughes, Jr. | E04C 2/22 52/589.1 |
| 8,561,943 B2 * | 10/2013 | Crook et al. | 244/54 |
| 8,707,710 B2 * | 4/2014 | Somanath et al. | 60/796 |
| 8,800,917 B2 * | 8/2014 | Machado et al. | 244/54 |
| 8,833,087 B2 * | 9/2014 | Rice et al. | 60/796 |
| 2003/0204151 A1 * | 10/2003 | Rastegar et al. | 601/41 |
| 2004/0197519 A1 * | 10/2004 | Elzey | B32B 3/28 428/68 |
| 2004/0255572 A1 * | 12/2004 | Porte | 60/226.1 |
| 2006/0163319 A1 * | 7/2006 | Ervin | A47J 36/02 228/101 |
| 2006/0255098 A1 * | 11/2006 | Runyan | B21D 26/055 228/112.1 |
| 2007/0152106 A9 * | 7/2007 | Perez-Sanchez | B64C 3/48 244/219 |
| 2007/0261411 A1 * | 11/2007 | Nagendra et al. | 60/796 |
| 2007/0262201 A1 * | 11/2007 | Cox | B64C 30/00 244/126 |
| 2008/0010996 A1 * | 1/2008 | Eleftheriou et al. | 60/797 |
| 2009/0155065 A1 * | 6/2009 | Xie et al. | 415/200 |
| 2009/0199565 A1 | 8/2009 | Brown | |
| 2009/0277224 A1 * | 11/2009 | Angel et al. | 65/60.1 |
| 2009/0282773 A1 * | 11/2009 | Queheillalt | B21C 23/14 52/690 |
| 2010/0012787 A1 | 1/2010 | Hnad | |
| 2010/0115965 A1 * | 5/2010 | Farah et al. | 60/798 |
| 2010/0224734 A1 * | 9/2010 | Grip | B64C 9/16 244/219 |
| 2011/0005234 A1 * | 1/2011 | Hashimoto et al. | 60/796 |
| 2011/0030386 A1 * | 2/2011 | Kumar et al. | 60/796 |
| 2011/0030387 A1 * | 2/2011 | Kumar et al. | 60/796 |
| 2011/0048029 A1 * | 3/2011 | Watson et al. | 60/797 |
| 2011/0283873 A1 * | 11/2011 | Wadley | F41H 5/023 89/36.02 |
| 2011/0293411 A1 * | 12/2011 | Deschamps et al. | 415/200 |
| 2012/0034076 A1 * | 2/2012 | Xie | 415/200 |
| 2012/0148392 A1 * | 6/2012 | Lussier et al. | 415/200 |
| 2012/0181765 A1 * | 7/2012 | Hill et al. | 280/62 |
| 2012/0237786 A1 * | 9/2012 | Morrison | B22D 19/00 428/596 |
| 2013/0251510 A1 * | 9/2013 | Runyan | F01D 25/00 415/119 |
| 2013/0276308 A1 * | 10/2013 | Kang | B21F 27/12 29/897 |
| 2013/0340373 A1 * | 12/2013 | Santiago Prowald | B64G 1/222 52/646 |
| 2014/0197277 A1 * | 7/2014 | Otto | 244/119 |
| 2014/0260187 A1 * | 9/2014 | Otto | 60/263 |
| 2014/0376844 A1 * | 12/2014 | Swanson | F16C 27/02 384/223 |
| 2015/0101261 A1 * | 4/2015 | Merrifield | E04C 3/005 52/67 |
| 2015/0266586 A1 * | 9/2015 | Runyan | B23K 20/02 428/593 |
| 2016/0046095 A1 * | 2/2016 | Clough | B32B 3/12 181/286 |

OTHER PUBLICATIONS

Chinese Search Report for Chinese Application No. 2013100699933, dated Nov. 27, 2015.

* cited by examiner

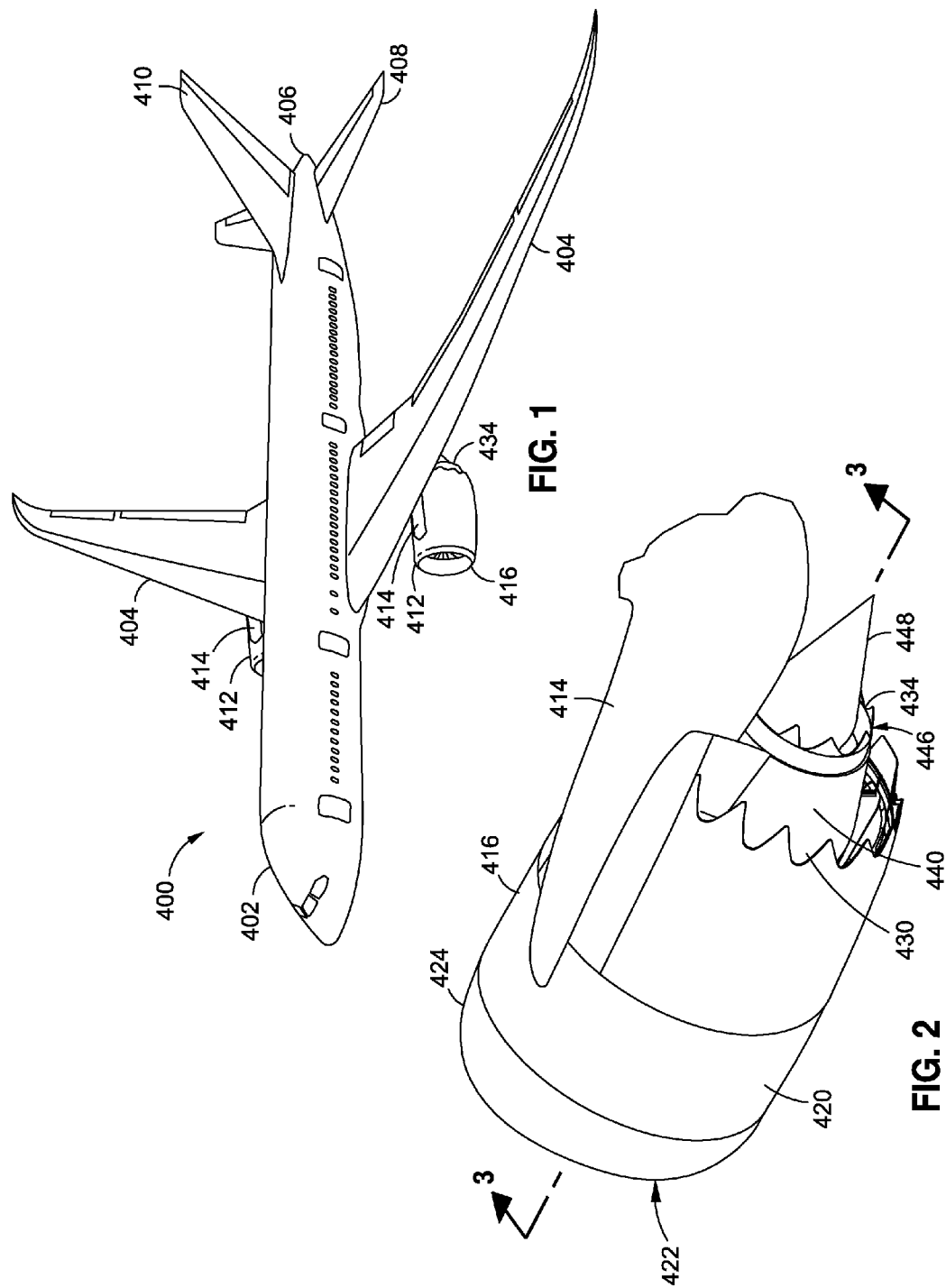

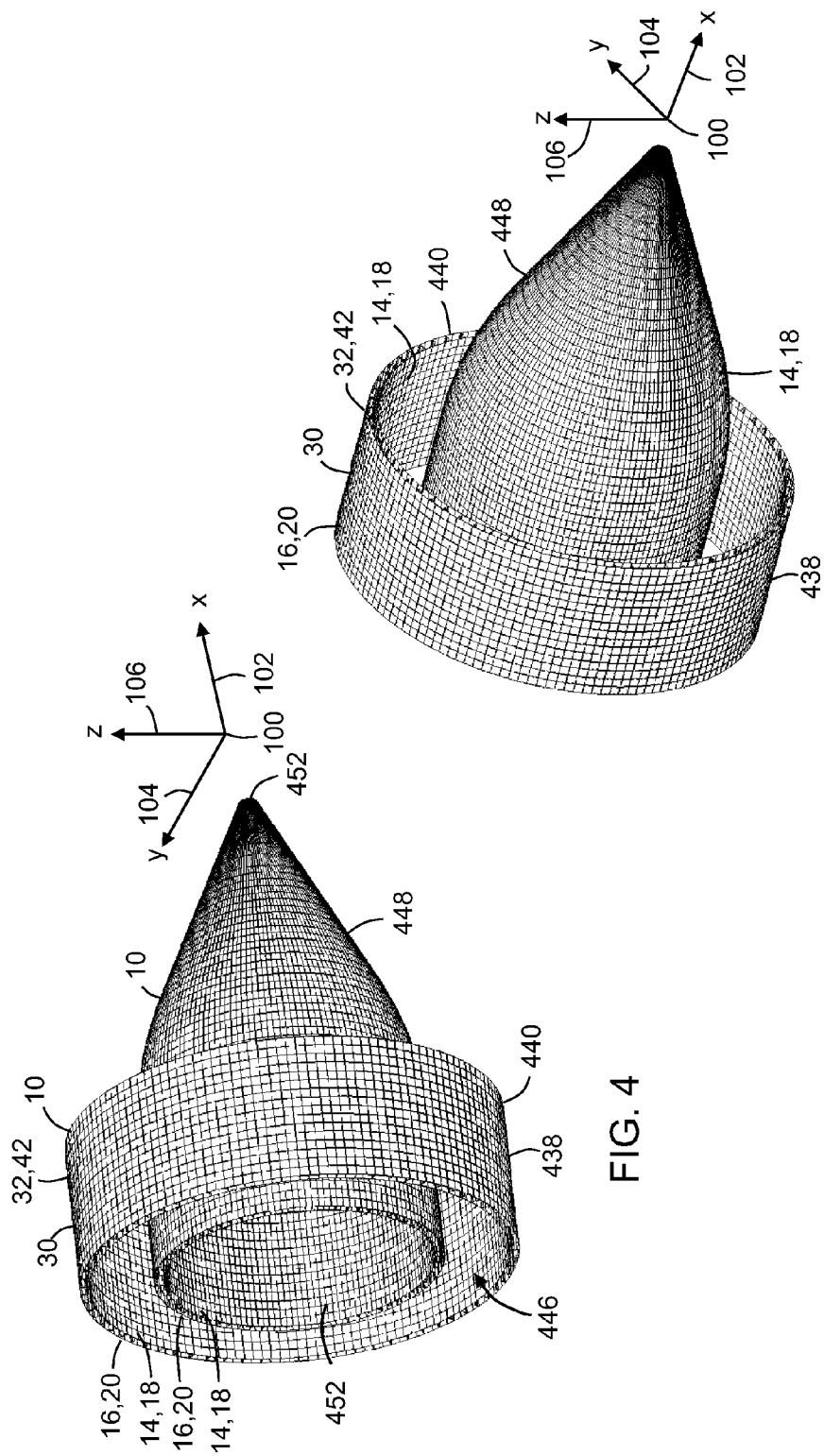

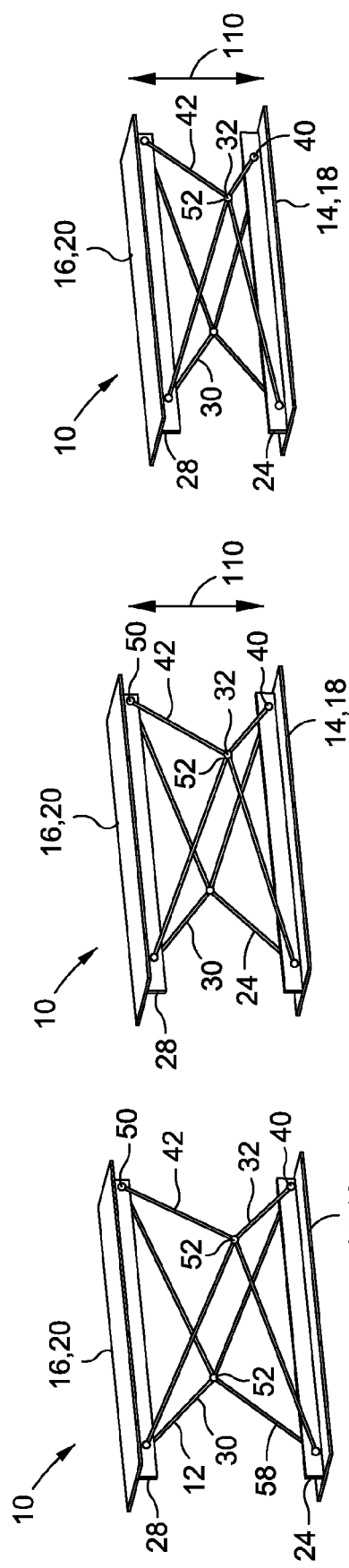

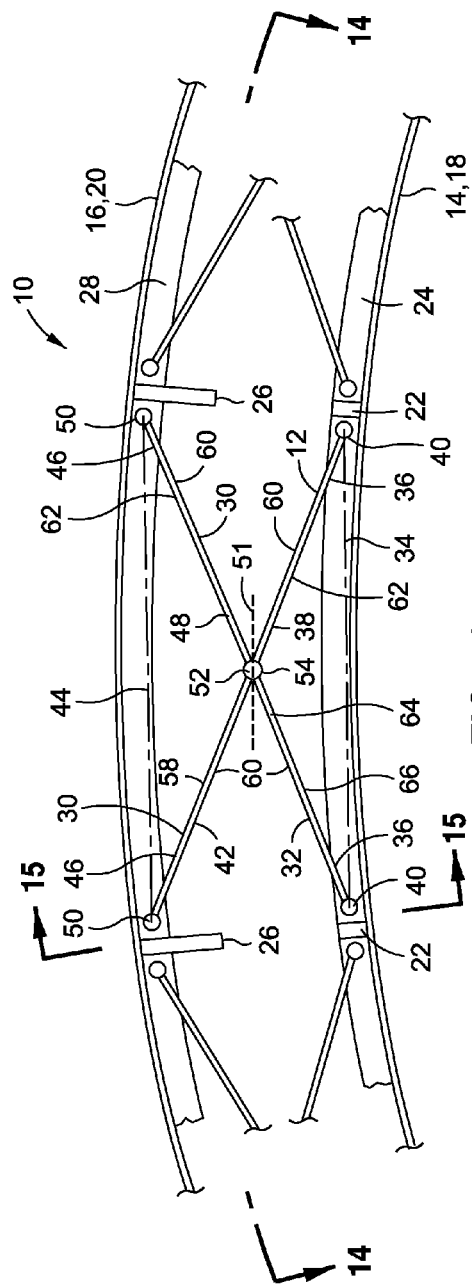
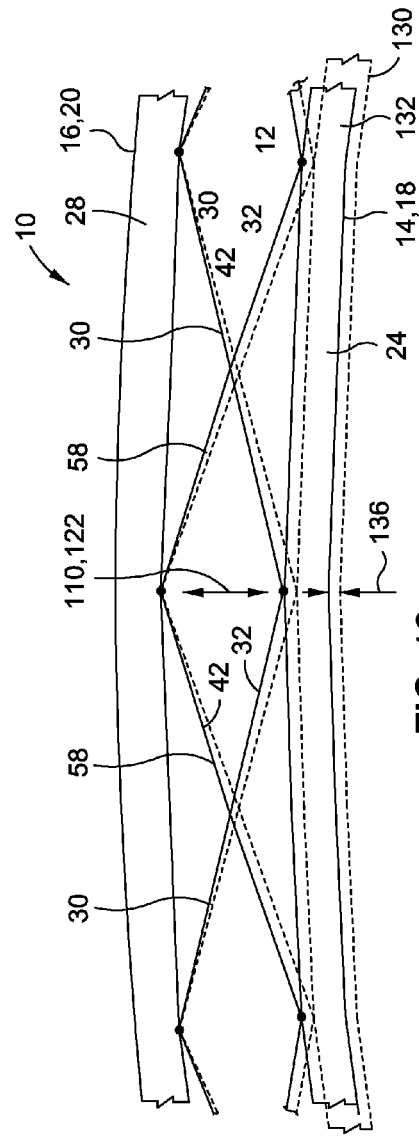
FIG. 12
FIG. 13

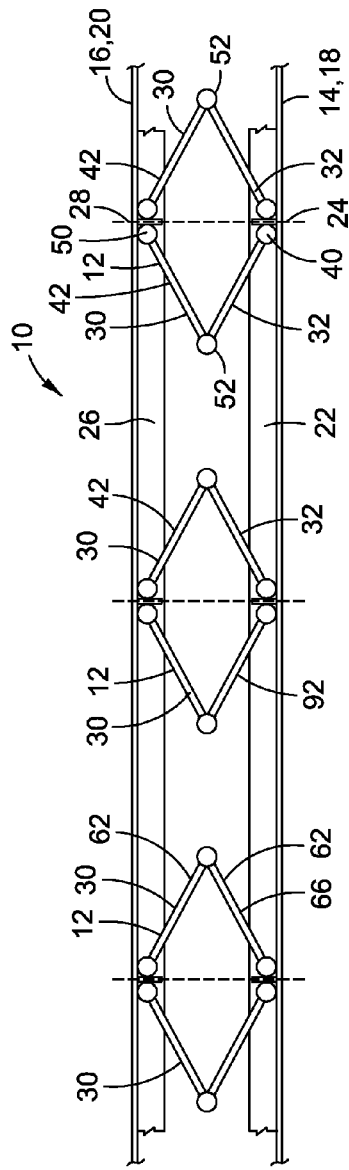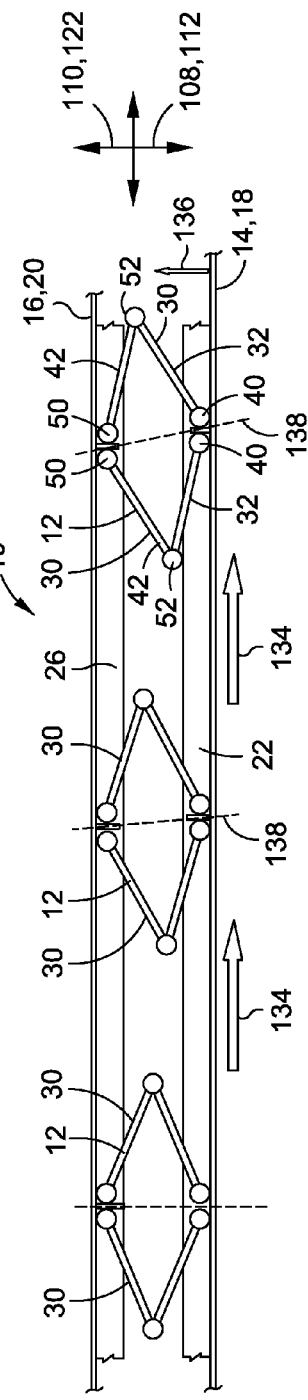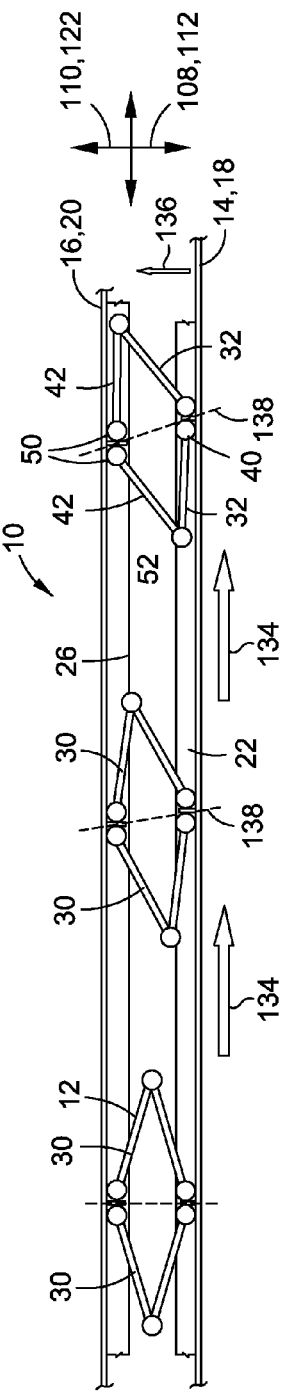

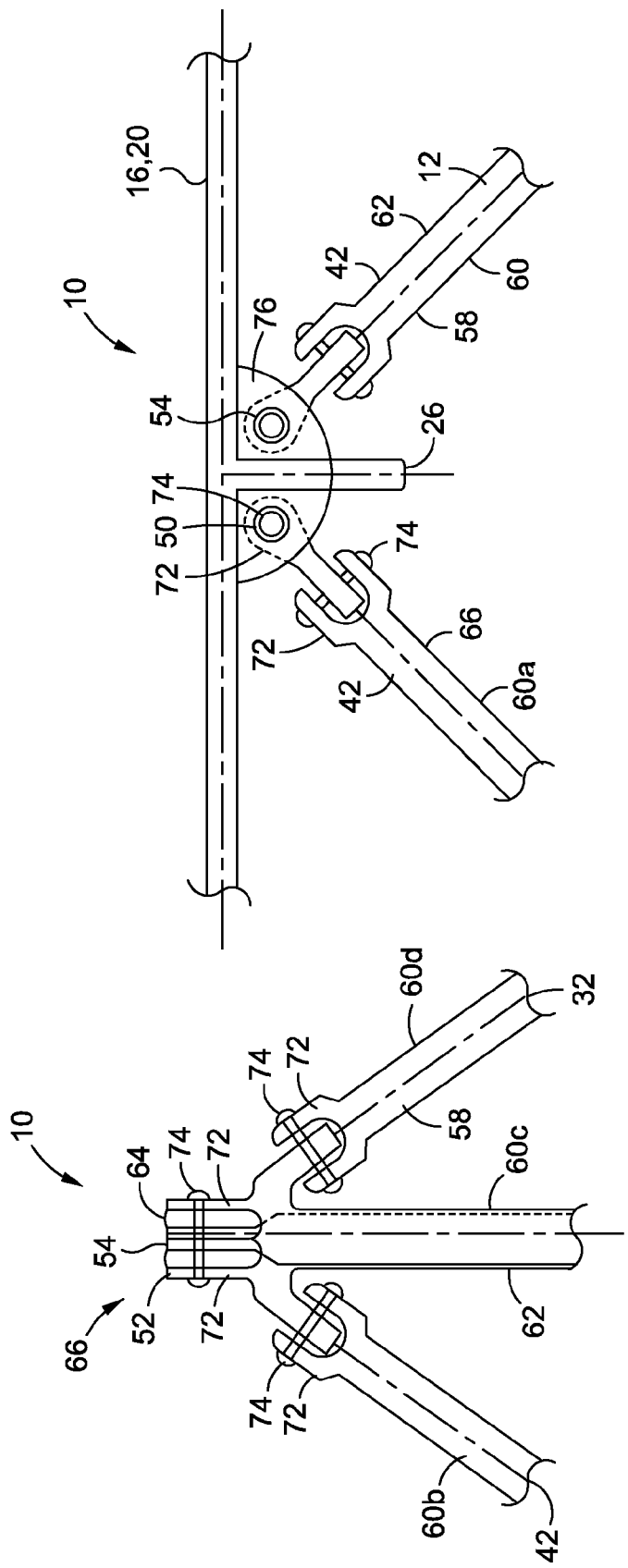

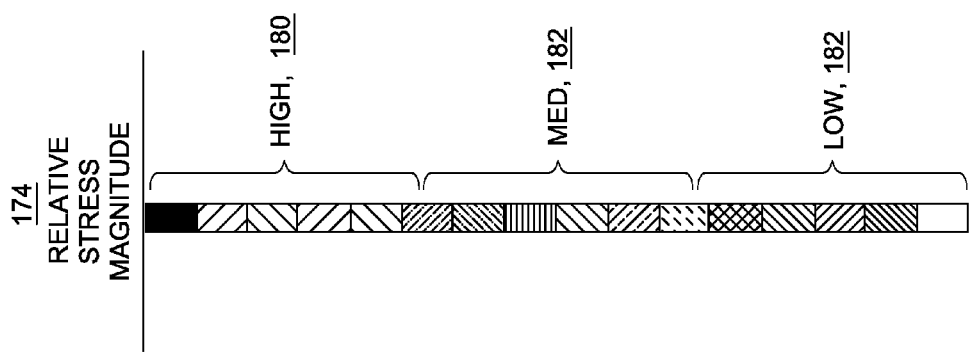
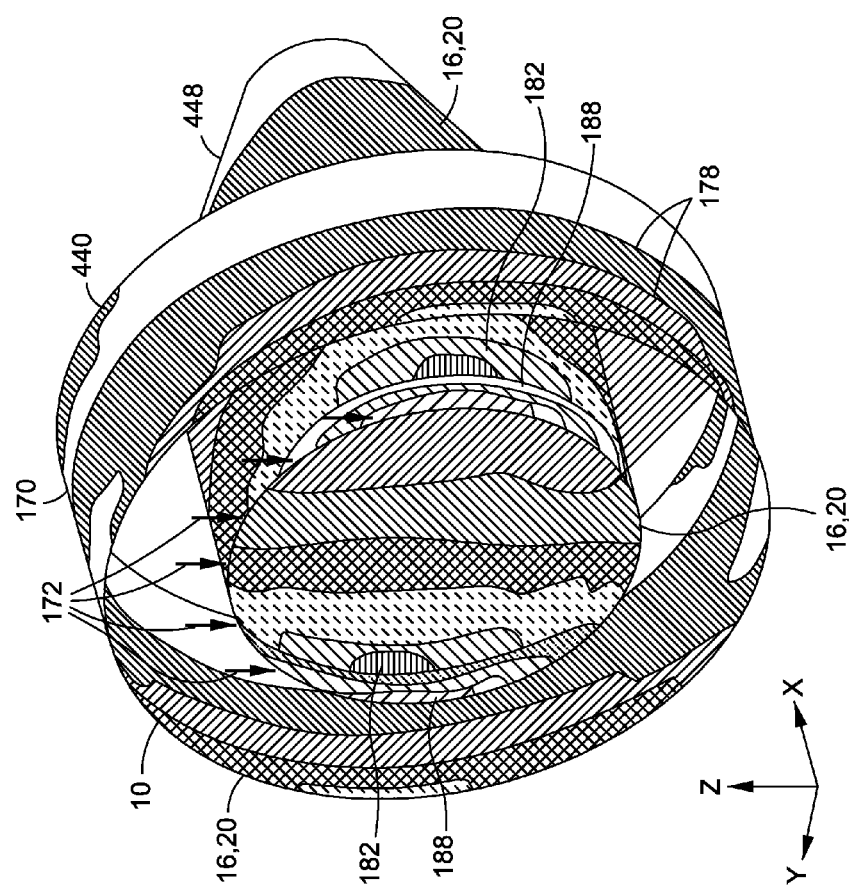
FIG. 24
FIG. 23

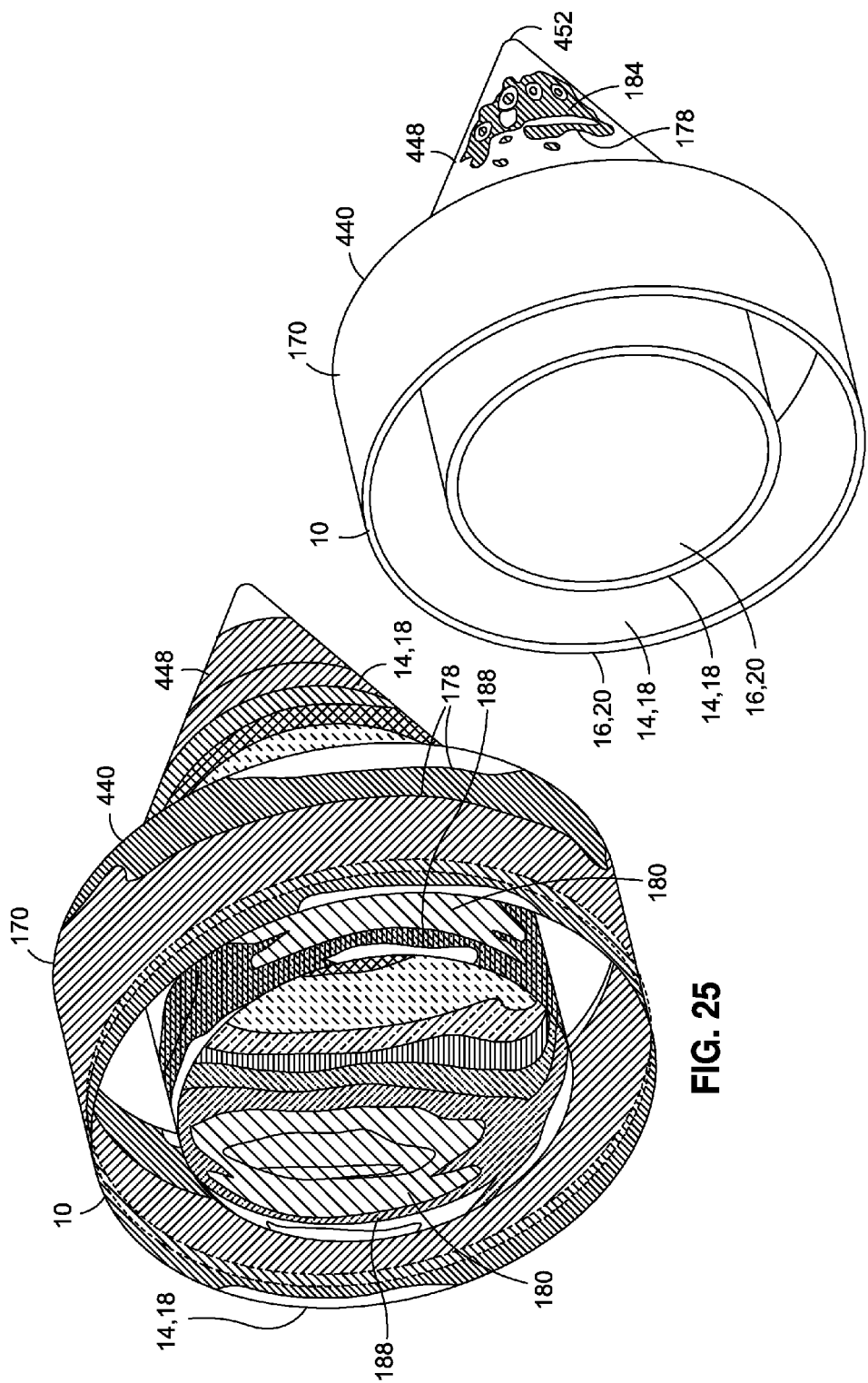

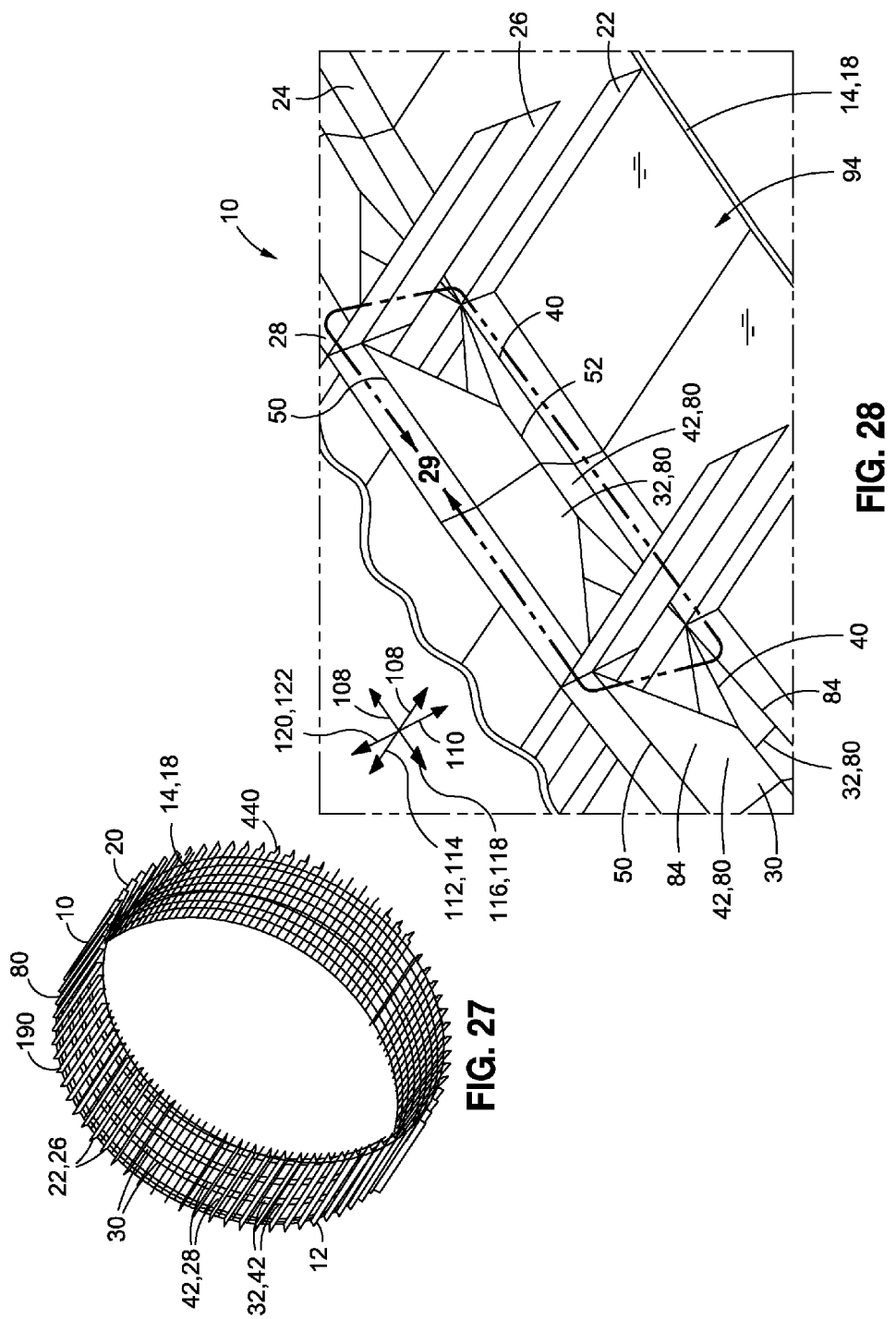

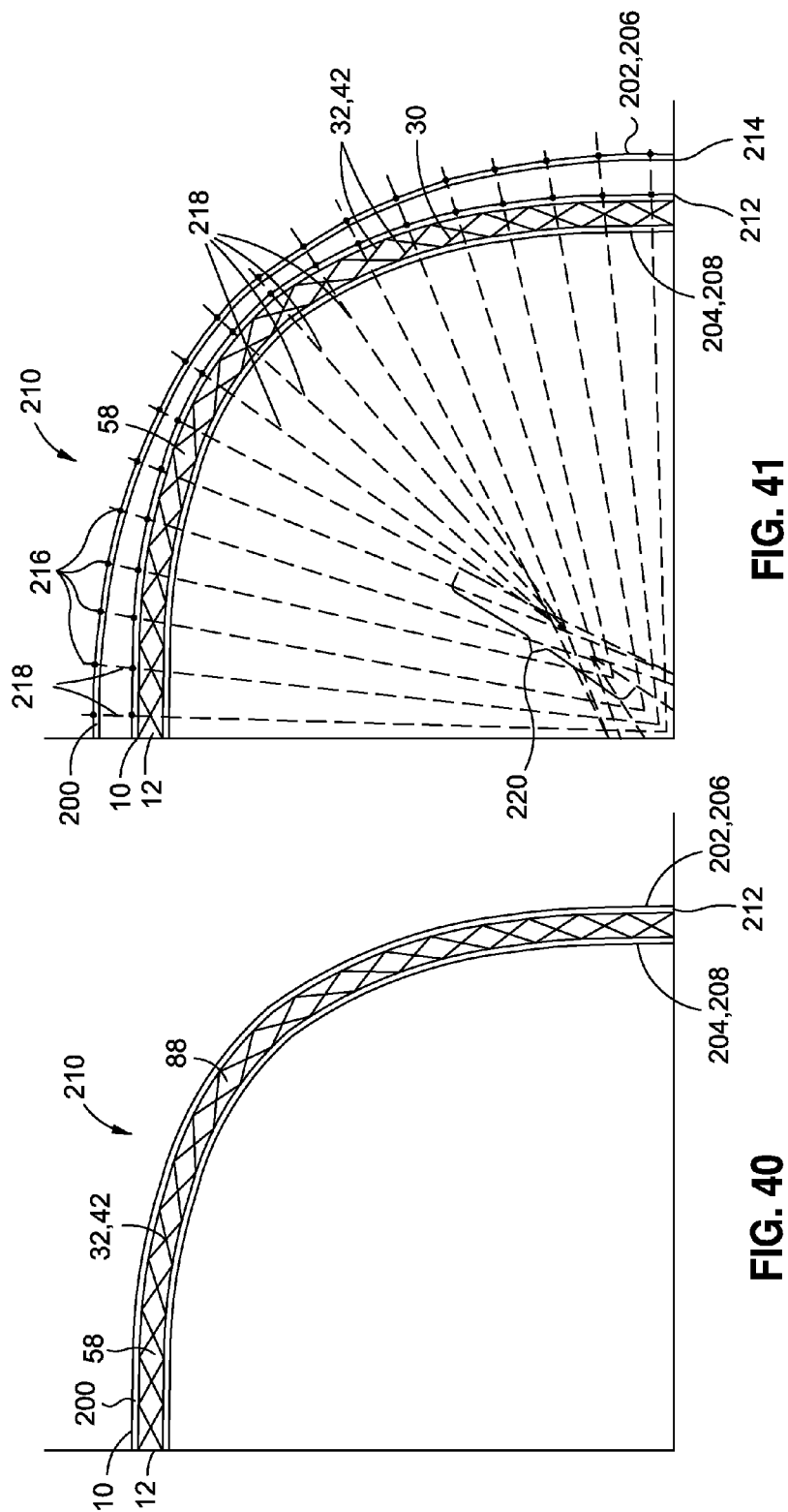

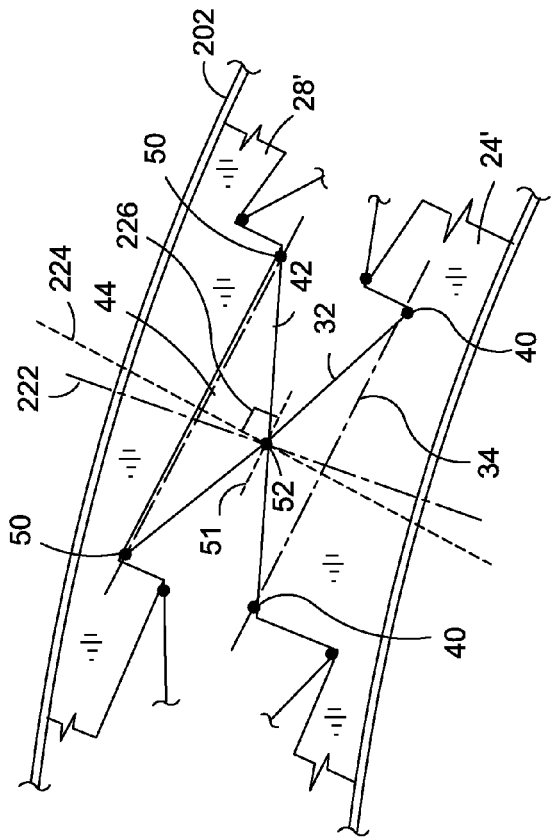
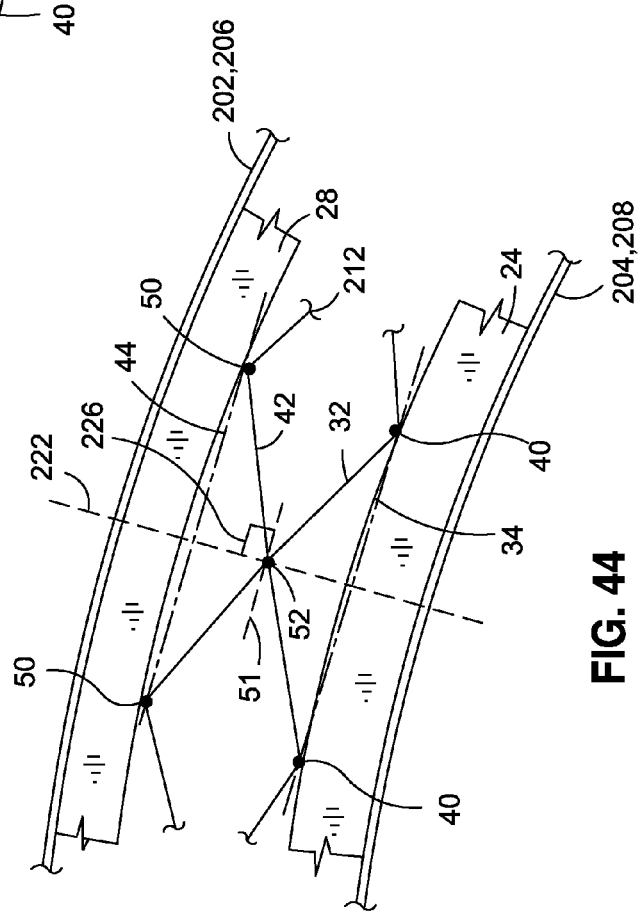
FIG. 45
FIG. 44

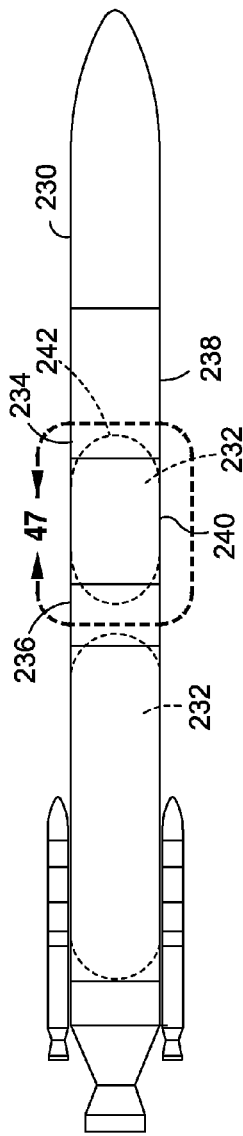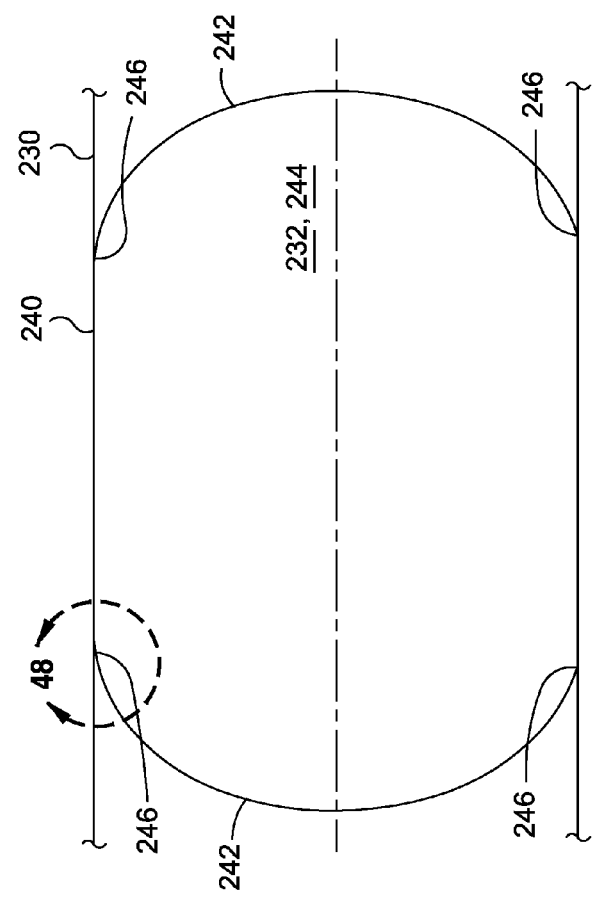

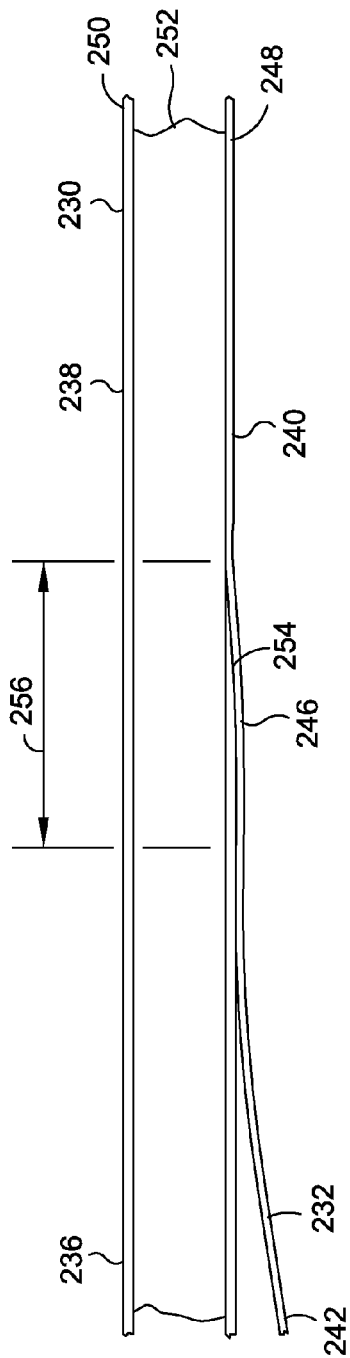
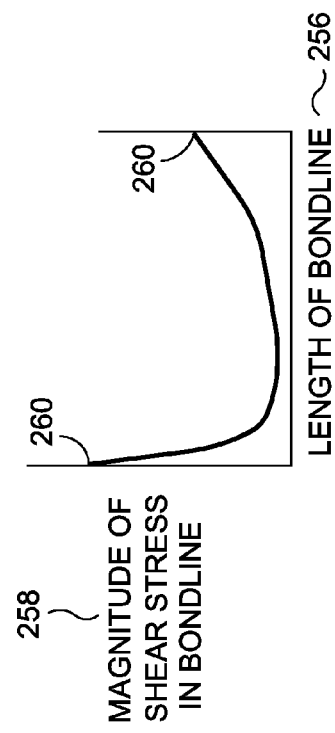

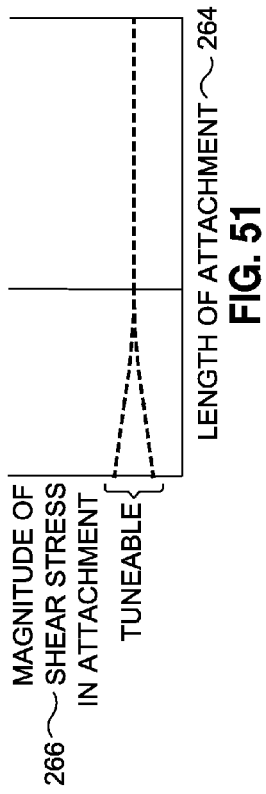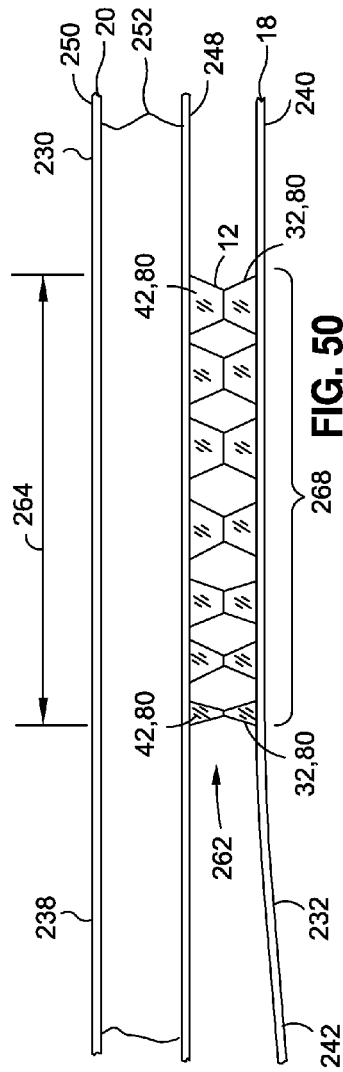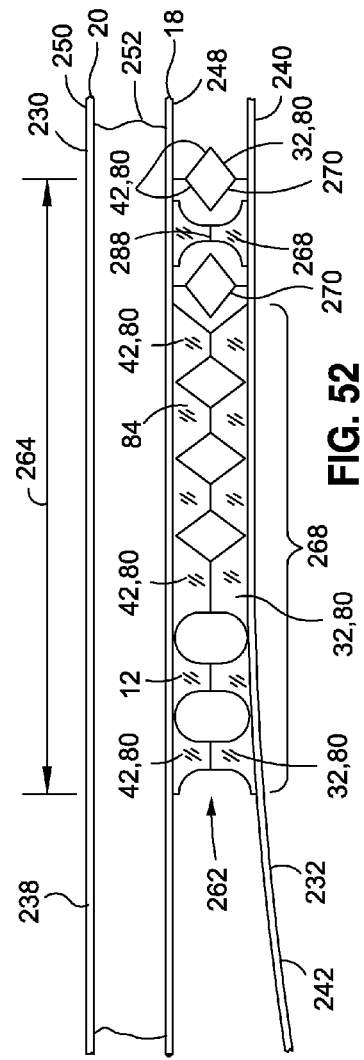

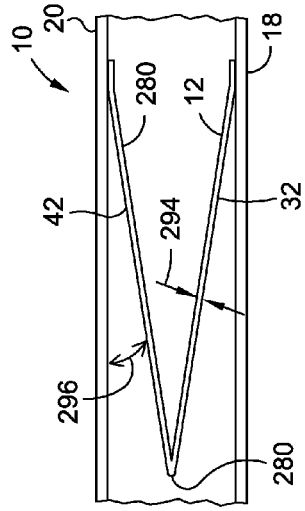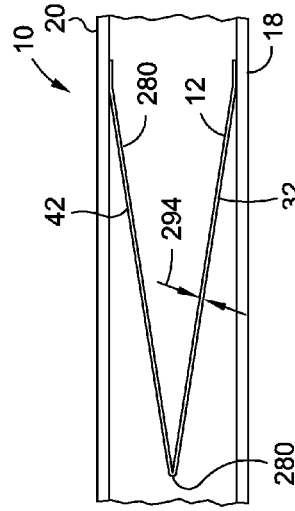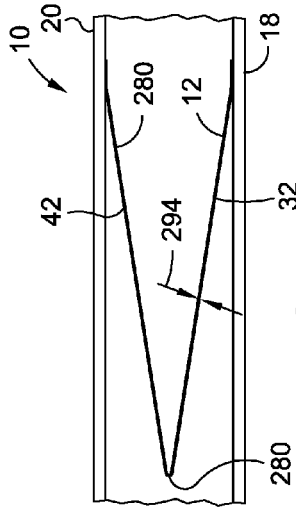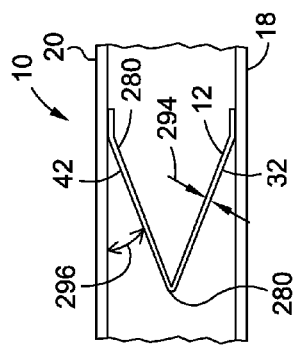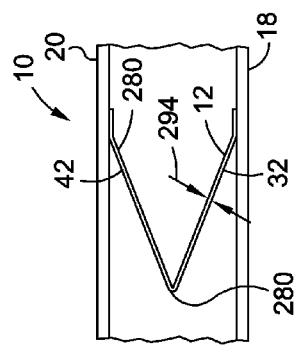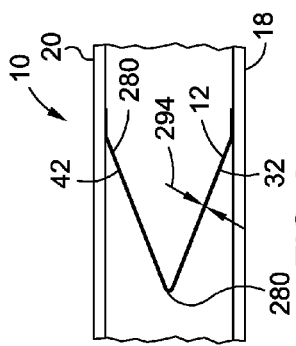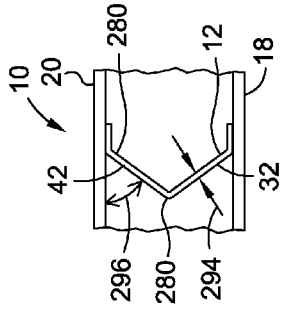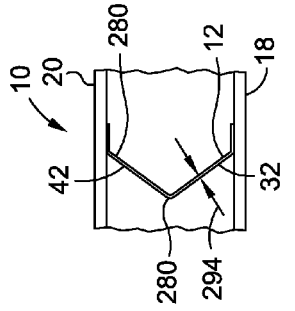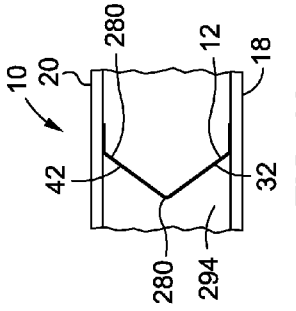

TWO-SURFACE SANDWICH STRUCTURE FOR ACCOMMODATING IN-PLANE EXPANSION OF ONE OF THE SURFACES RELATIVE TO THE OPPOSING SURFACE

FIELD

The present disclosure relates generally to structural design and, more particularly, to the design of sandwich panels subjected to differential heating.

BACKGROUND

The exhaust nozzle of a jet engine is typically constructed of a high temperature material to withstand the relatively high temperature of combustion gases outflowing from the engine core. For example, many exhaust nozzles are conventionally constructed of titanium which has a favorable strength-to-weight ratio and favorable mechanical properties at elevated temperatures. However, the trend in jet engine design is an increase in combustion gas temperature in the exhaust outflow. Such increased combustion gas temperatures may approach the operating limits of titanium.

Sandwich structure may be used in high-temperature structural applications because of the high specific strength and relatively low weight of sandwich structure. Conventional sandwich structure may be comprised of a pair of opposing face sheets separated by a core material. Conventional core material in a conventional sandwich structure may provide a relatively high level of stiffness in multiple directions. For example, conventional core material may provide a relatively high level of stiffness in a lengthwise or longitudinal in-plane direction of the sandwich structure and in a widthwise or transverse in-plane direction of the sandwich structure. The core material may also provide extensional stiffness in an out-of-plane direction of the sandwich structure.

Unfortunately, when a sandwich structure is initially subjected to a high temperature environment such as during engine startup of a gas turbine engine when hot combustion gas flows over the exhaust nozzle, one face sheet may be rapidly heated to a higher temperature than the opposing face sheet. The resulting increase in temperature of the heated face sheet may result in an expansion of the face sheet in an in-plane direction. The in-plane expansion of the heated face sheet may result in significant stress in both face sheets due to the shear coupling of the face sheets by the stiff core.

As can be seen, there exists a need in the art for a system and method for providing a sandwich structure that provides a high level of strength and stiffness while simultaneously accommodating in-plane expansion of one of the face sheets of the sandwich structure due to differential heating of the sandwich structure.

SUMMARY

The above-noted needs associated with sandwich structures are specifically addressed by the present disclosure which provides a sandwich structure including a first skin, a second skin, a first hinge member, and a second hinge member. The first hinge member may be movably coupled to the first skin and a first skin joint. The second hinge member may be movably coupled to the second skin and second skin joint. The first hinge member and the second member may be movably coupled to one another at a member joint located between the first and second skin joint.

In a further embodiment, disclosed is an engine exhaust nozzle including a sandwich structure having a first skin, a second skin, a first hinge member, and a second hinge member. The first hinge member may be movably coupled to the first skin and a first skin joint. The second hinge member may be movably coupled to the second skin and second skin joint. The first hinge member and the second member may be movably coupled to one another at a member joint located between the first and second skin joint.

Also disclosed is method of minimizing shear stress in a sandwich structure. The method may include the step of providing a first skin separated from a second skin by a first hinge member and a second hinge member movably coupled to respective ones of the first and second skin and to one another. The method may further include moving the first skin relative to the second skin in an in-plane direction defining a longitudinal direction of the sandwich structure. The method may additionally include moving the first and second hinge member in response to moving the first and second skin in an in-plane direction. In addition, the method may include moving the first skin relative to the second skin in an out-of-plane direction in response to relative movement of the first and second skin in an in-plane direction.

In a further embodiment, disclosed is a method of operating an aircraft engine which may include the step of providing the aircraft engine with a nozzle having a sandwich structure comprising a first skin separated from a second skin by a first hinge member and a second hinge member movably coupled to respective ones of the first and second skin and to one another. The method may further include operating the engine and causing the first skin to move relative to the second skin in an in-plane direction defining a longitudinal direction of the sandwich structure.

Also disclosed is a method of fabricating a sandwich structure which may include the step of configuring a first skin to be separated from a second skin by a first hinge member and a second hinge member. The method may additionally include configuring the first and second hinge member to be movably coupled to respective ones of the first and second skin and to one another in a manner such that the first skin is movable relative to the second skin in an in-plane direction defining a longitudinal direction of the sandwich structure. The first and second hinge member may also be movably coupled to respective ones of the first and second skin and to one another such that the first and second hinge members are movable in response to relative movement of the first and second skin in the in-plane direction. In addition, the first and second hinge member may be movably coupled to respective ones of the first and second skin and to one another such that the first skin is movable relative to the second skin in an out-of-plane direction in response to relative movement of the first and second skin in the in-plane direction.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective illustration of an aircraft;

FIG. 2 is a perspective illustration of a gas turbine engine having an exhaust nozzle that may formed using a sandwich structure as disclosed herein;

FIG. 4 is a perspective illustration of a computer model of a cowl and an exhaust cone formed of sandwich structure;

FIG. 5 is a further perspective illustration of the computer model of the exhaust nozzle;

FIG. 9 is a perspective illustration of the shear structure of FIG. 8 wherein the first and second skins are separated by an original distance prior to differential heating thereof;

FIG. 10 is a perspective illustration of the first and second skin separated by a reduced distance as may occur during in-plane expansion of the first skin relative to the second skin and out-of-plane movement of the first skin relative to the second skin;

FIG. 11 is a perspective illustration of the first and second skin separated by a further reduced distance relative to FIG. 10;

FIG. 12 is an end view of the sandwich structure of the cowl illustrating the coupling of the hinge members to the first and second skin at respective first and second skin joints and the coupling of the hinge members to one another at a member joint;

FIG. 13 is a computer simulation of the sandwich structure of FIG. 7 and illustrating the deflection of the first skin toward the second skin in an out-of-plane direction or radial direction due to differential heating;

FIG. 15 is a side view of the sandwich structure taken along line 15 of FIG. 12;

FIG. 16 is a side view of the sandwich structure of FIG. 15 illustrating movement of the first skin relative to the second skin along an in-plane longitudinal direction of the sandwich structure;

FIG. 17 is a side view of the sandwich structure of FIG. 16 illustrating rolling movement of the hinge members in response to in-plane movement of the first skin relative to the second skin;

FIG. 19 is a view of the shear structure taken along line 19 of FIG. 18 and illustrating the interconnection of the bars to one another;

FIG. 20 is an illustration of an embodiment of the shear structure and the interconnection of the bars to the second skin using clevis fittings;

FIG. 23 is a stress plot of the second skin (e.g., cold side) of the cowl and the exhaust cone in response to a 175-g acceleration of the exhaust nozzle in a vertical direction;

FIG. 24 is a legend of the stress corresponding to the stress plots shown in FIGS. 23 and 25;

FIG. 25 is a perspective illustration of a stress plot of the first skin (e.g., hot side) of the cowl and the exhaust cone in response to the 175-g acceleration and illustrating a relatively uniform stress distribution as a result of the circumferential shear stiffness provided by the shear structure;

FIG. 26 is a perspective illustration of a stress plot of the first and second skin of the exhaust nozzle in response to a 600° F. temperature differential and resulting in a relatively low magnitude or negligible stress distribution due to the relatively low or negligible shear stiffness in the longitudinal (e.g., axial) direction and relatively low extensional stiffness in the radial direction provided by the shear structure;

FIG. 27 is a model of the cowl incorporating shear panels in the shear structure;

FIG. 28 is an view of a portion of the model of FIG. 27 and illustrating the arrangement of the shear panels interconnecting the first and second skin;

FIG. 40 is an end view of a portion of the exhaust cone taken along line 40 of FIG. 39 and illustrating the first skin in an original position prior to differential heating;

FIG. 41 is an end view of the portion of the exhaust cone of FIG. 40 and illustrating the first skin in a deflected position in response to differential heating and further illustrating a non-common origin of a plurality of deflection trajectories of the first skin;

FIG. 44 is an enlarged view of one of the hinge members in an original orientation;

FIG. 45 is an enlarged view of the hinge member of FIG. 44 aligned with the revised hinge alignment vector at that location;

FIG. 46 is a side view of a launch vehicle having propellant tanks;

FIG. 47 is a side view of a propellant tank attached to a forward skirt and an aft skirt of the launch vehicle using a conventional Y-joint;

FIG. 48 is a cross-sectional view of a conventional Y-joint of the tank dome to the aft skirt along an adhesive bondline;

FIG. 49 is a plot of shear stress vs. location along the bondline of the conventional Y-joint;

FIG. 50 is a cross-sectional view of the tank attached to the vehicle structure using a plurality of hinge members forming a sandwich structure between the tank and the vehicle structure;

FIG. 51 is a plot of shear stress vs. length of attachment of the tank to the vehicle structure of FIG. 50;

FIG. 52 is a cross-sectional view of the tank attached to the vehicle structure using axially oriented hinge members and circumferentially oriented hinge members;

FIG. 57 is an end view of an embodiment of a unitary hinge structure wherein the hinge members have a panel thickness and are oriented at a hinge angle;

FIG. 58 is an end view of an embodiment of a unitary hinge structure wherein the hinge members are oriented at a reduced hinge angle relative to the unitary hinge structure shown in FIG. 57;

FIG. 59 is an end view of a further embodiment of a unitary hinge structure wherein the hinge members are oriented at a further reduced hinge angle relative to the unitary hinge structure shown in FIG. 58;

FIGS. 60-62 are end views of an embodiment of the unitary hinge structure wherein the hinge members are formed in a reduced panel thickness relative to the panel thickness of the unitary hinge structures shown in FIGS. 57-59;

FIGS. 63-65 are end views of a further embodiment of the unitary hinge structure wherein the hinge members are formed in a further reduced panel thickness relative to the panel thickness of the unitary hinge structures shown in FIGS. 60-62;

DETAILED DESCRIPTION

Figure 3:
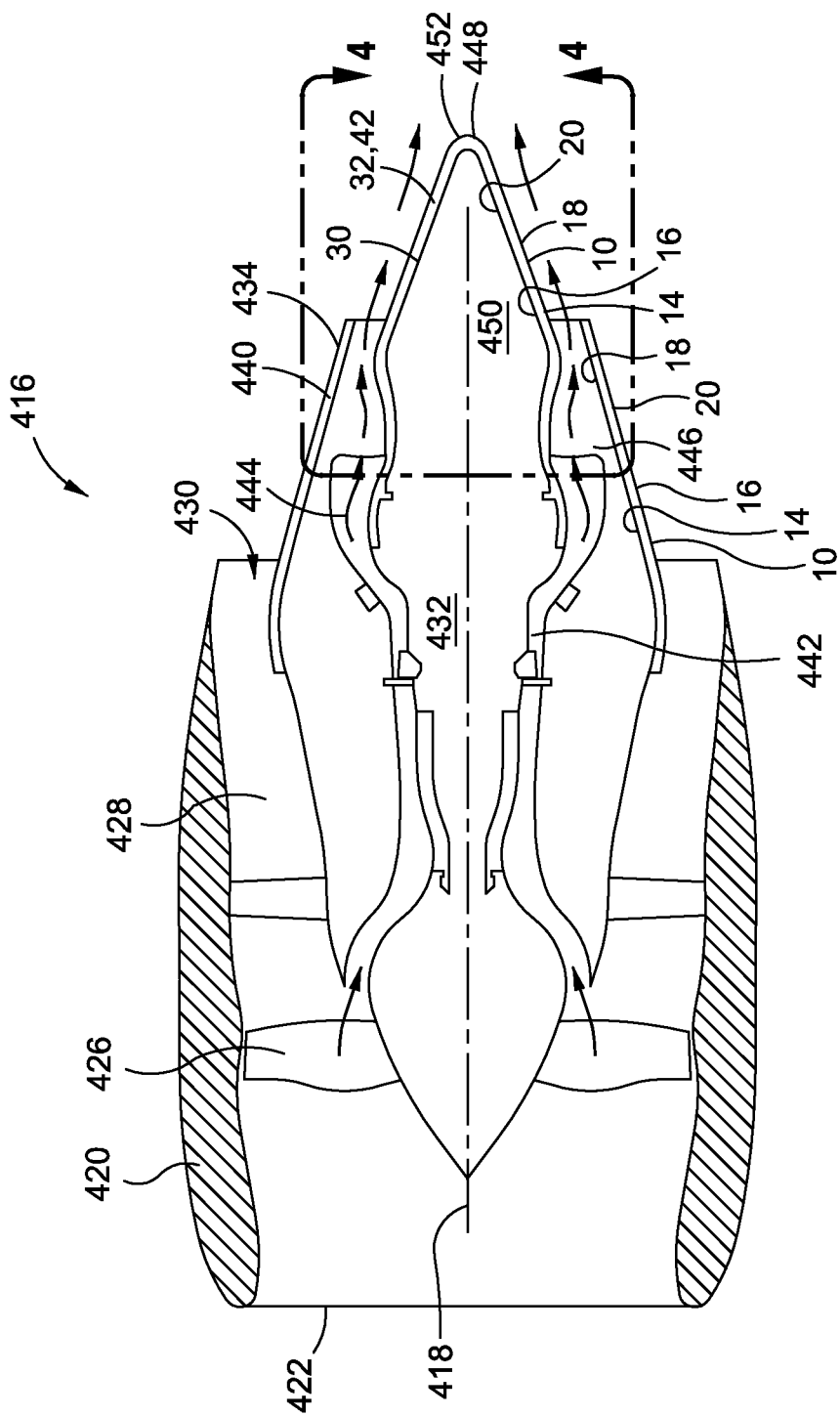
FIG. 3 is a cross-sectional view of the gas turbine engine illustrating combustion gas flowing through an annular exhaust duct formed by a cowl and an exhaust cone.

Referring now to the drawings wherein the showings are for purposes of illustrating preferred and various embodiments of the disclosure, shown in FIG. 1 is a perspective illustration of an aircraft 400 which may incorporate one or more embodiments of a sandwich structure 10 (FIG. 3) as disclosed herein. The aircraft 400 may include a fuselage 402 having an empennage 406 which may include a horizontal stabilizer 408, a vertical stabilizer 410, and a pair of wings 404 extending outwardly from the fuselage 402. The aircraft 400 may include one or more propulsion units 412 such as gas turbine engines 416 mounted to pylons or struts 414 extending from the wings 404.

FIG. 2 is a perspective illustration of a gas turbine engine 416. The gas turbine engine 416 may include a nacelle 420 having an inlet 422 at a forward end of the gas turbine engine 416 and an exhaust nozzle 434 at an aft end of the gas turbine engine 416. The exhaust nozzle 434 may comprise a cowl 440 and an exhaust cone 448. In the present disclosure, the cowl 440 and/or the exhaust cone 448 may be formed of the sandwich structure 10 (FIG. 3).

Figure 7:
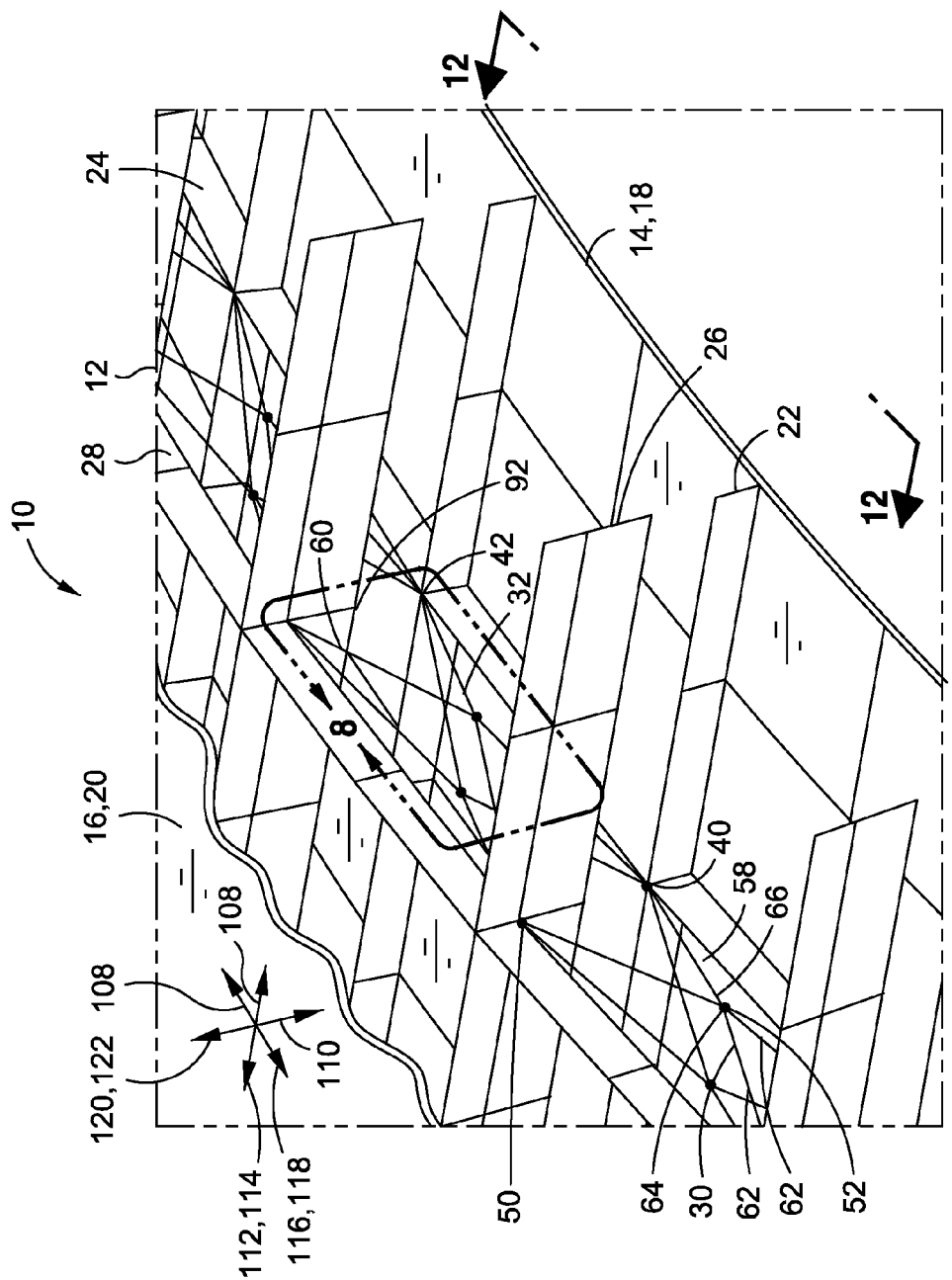
FIG. 7 is a perspective illustration of a portion of the cowl showing the hinge members configured as truss structures and illustrating circumferential and transverse stiffeners that may optionally be included with the first and second skin.

Referring briefly to FIG. 7, the sandwich structure 10 may comprise a first skin 18 and a second skin 20 coupled by a shear structure 12. The first skin 18 and the second skin 20 may be oriented substantially parallel to one another. However, the first skin 18 and second skin 20 may be oriented at any angle relative to one another and are not limited to a substantially parallel relationship. Although the present disclosure illustrates the sandwich structure 10 as being formed as a closed cross-section such as a circular 436 (FIG. 4) cross-section 438 (FIG. 4) or a non-circular closed cross-section 200 (FIG. 38), the sandwich structure 10 may be formed as an open section (not shown) such as in a planar shape (not shown) or as a combination planar shape and curved shape (not shown). Advantageously, the shear structure 12 is configured to allow relative movement of the first and second skin 18, 20 in an in-plane 108 longitudinal 112 or axial 114 direction while preventing relative movement of the first and second skin 18, 20 in an in-plane 108 transverse 116 or circumferential 118 direction. Furthermore, the shear structure 12 is advantageously configured to allow relative movement of the first and second skin 18, 20 in an out-of-plane 110 direction oriented substantially normal or perpendicular to the in-plane 108 directions. In the present disclosure, the terms "transverse" and "circumferential" may be used interchangeably. The terms "longitudinal' and "axial" may also be used interchangeably.

Advantageously, the sandwich structure 10 may have a relatively low level of shear stiffness or negligible shear stiffness along an in-plane 108 longitudinal 112 direction and relatively low high or substantial shear stiffness along an in-plane transverse 116 or circumferential 118 direction. In addition, the sandwich structure 10 may have a relatively low level of extensional stiffness in the out-of-plane 110 direction. In an embodiment, the shear structure 12 may be configured such that the level of stiffness in the in-plane 108 longitudinal 112 direction and out-of-plane 110 direction may be tuned or tailored for a given application as described in greater detail below. Advantageously, by providing a high level of shear stiffness in an in-plane 108 transverse 116 direction and allowing relative movement of the first and second skin 18, 20 in an in-plane 108 longitudinal 112 direction and in an out-of-plane 110 direction, the sandwich structure 10 may minimize thermal loads that may otherwise occur during differential heating of the first and second skin 18, 20 as described in greater detail below. The sandwich structure 10 may also minimize stress that may otherwise occur in response to changing internal pressure of a pressurized tank having a tank wall (e.g., a first skin) attached to a second skin using the shear structure as shown in FIGS. 50 and 52 and described in greater detail below.

In addition to minimizing thermal stress due to differential temperatures of the first and second skins 18, 20, the sandwich structure 10 may also minimize stress that may occur in response to differential coefficients of thermal expansion (CTE) of the first skin 18 relative to the second skin 20. For example, as described in greater detail below, a first skin (e.g., a hot side) of an exhaust nozzle may be fabricated of ceramic material which may have a higher temperature capability but a lower coefficient of thermal expansion (CTE) than a second skin (e.g. cold side) of the exhaust nozzle which may be fabricated of a different material such as titanium, inconel, or other materials. Advantageously, the sandwich structure as disclosed herein may minimize stress caused by the differential coefficients of thermal expansion during changes in temperature (e.g., heating or cooling) of the first and second skin 18, 20.

FIG. 3 is a simplified cross-sectional illustration of the gas turbine engine 416 illustrated in FIG. 2. Shown is the nacelle 420 which may house the core engine 432. One or more fans 426 may be mounted to the forward end of the core engine 432 and may be rotatable about the engine axis 418 for drawing ambient air into the inlet 422. A portion of the air may pass through a fan duct 428 and may exit a fan outlet 430. A portion of the ambient air may also enter the core engine 432 and may pass through a combustion chamber 442 where the air may be mixed with fuel and ignited causing expansion thereof. The resulting hot combustion gas 444 may exit through an annular exhaust duct 446 formed by the cowl 440 and the exhaust cone 448 at the aft end of the gas turbine engine 416. The hot combustion gas 444 passes over the cowl 440 and the exhaust cone 448 and causes differential heating of the cowl 440 and the exhaust cone 448 such as during engine start-up.

Figure 6:
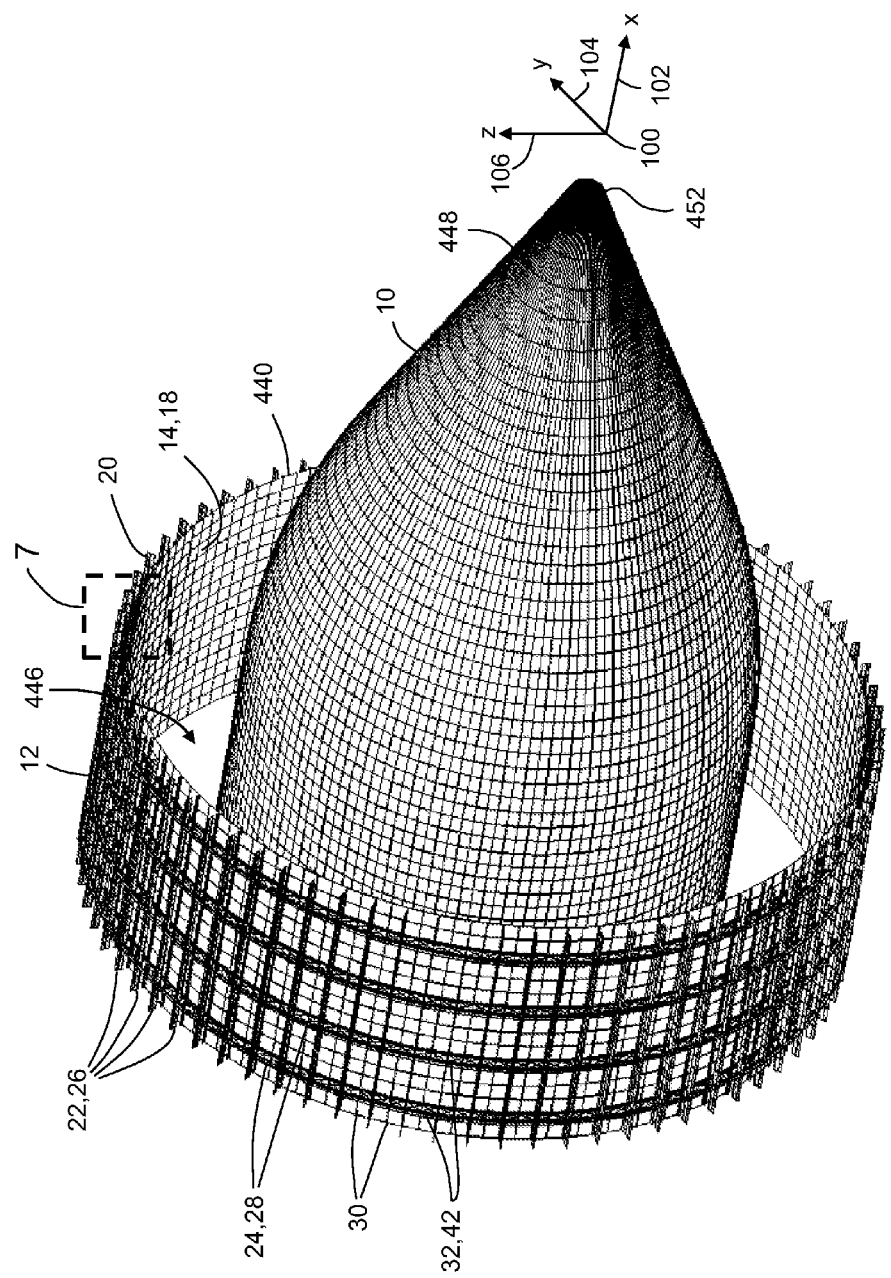
FIG. 6 is a perspective illustration of the computer model of the exhaust nozzle with a second skin of the cowl removed to illustrate a plurality of hinge members and internal stiffeners that may be included in the sandwich structure.

FIGS. 4-5 are illustrations of the sandwich structure 10 implemented as an exhaust nozzle 434 having an outer cylindrical cowl 440 and a cylindrical-conical exhaust cone 448. Although shown as having a closed cross-section of circular shape, the sandwich structure 10 may be implemented in any shape including an open cross-section (not shown) and in a non-circular cross-section as described below. The sandwich structure 10 includes the first skin 18 and the second skin 20 coupled together by the shear structure 12 (FIG. 6). For purposes of the present disclosure, the first skin 18 comprises the heated side or hot side 14 of the sandwich structure 10 and the second skin 20 comprises the cold side 16 of the sandwich structure 10. In FIG. 4-5, the first skin 18 of the cowl 440 forms the annular interior surface of the cowl 440 and the second skin forms the exterior surface of the cowl 440. The first skin 18 of the exhaust cone 448 forms a cylindrical-conical exterior surface of the exhaust cone 448 and the second skin of the exhaust cone 448 defines an interior 450 (FIG. 4) of the exhaust cone 448. In the present disclosure, the sandwich structure 10 of the exhaust nozzle 434 is described in relation to a reference coordinate system 100. The x-axis 102 defines the longitudinal 112 direction (FIG. 7) or axial direction, the y-axis 104 defines a local transverse 116 direction (FIG. 7) or a local circumferential 118 direction (FIG. 7), and the z-axis 106 defines the out-of-plane 110 direction (FIG. 7) or a local radial 122 direction (FIG. 7).

Although the sandwich structure 10 is described in the context of an exhaust nozzle 434 of a gas turbine engine 416, the sandwich structure 10 may be implemented in any one of a wide variety of applications, without limitation. For example, the sandwich structure 10 may be implemented in a nozzle of a rocket engine (not shown). Alternatively, the sandwich structure 10 may be implemented in a thermal protection system (not shown) of a vehicle such as a hypersonic vehicle (not shown) or a re-entry vehicle (not shown). The sandwich structure 10 may also be implemented in applications wherein temperature differential of a first and second skin is a result of cooling of one of the first and second skins as opposed to the heating of one of the first and second skins. In this regard, the sandwich structure 10 as disclosed herein may be incorporated into any structural application that may be subjected to a temperature differential across opposing skins or face sheets. Furthermore, the sandwich structure 10 may be implemented in applications for attaching a tank wall of a tank to a second skin as mentioned above and described below.

FIG. 6 shows the exhaust nozzle 434 (FIG. 3) with the second skin 20 (e.g., hot side 14) omitted to illustrate the shear structure 12. The shear structure 12 may include a plurality of first longitudinal stiffeners 22 and a plurality of second longitudinal stiffeners 26 mounted to the respective first and second skin 18, 20 and extending along the axial 114 direction (FIG. 7) or longitudinal 112 direction (FIG. 7). The first and second longitudinal stiffeners 22, 26 may increase the stiffness of the respective first and second skin 18, 20 in the longitudinal 112 direction. The shear structure 12 may include a plurality of first transverse stiffeners 24 and a plurality of second skin 20 transverse stiffeners 28 extending in a transverse 116 or circumferential 118 direction (FIG. 7) for increasing the stiffness of the respective first and second skin 18, 20 in the transverse 116 or circumferential 118 direction.

In an embodiment, any one of the stiffeners 22, 24, 26, 28 may be integrally formed with or machined into the first or second skin 20. Alternatively, any one of the stiffeners 22, 24, 26, 28 may be separately formed and subsequently attached to the first skin 18 or the second skin 20. The stiffeners 22, 24, 26, 28 may be formed of the same material or a different material than the first skin 18 and second skin 20. For example, the first skin 18 may be formed of one material, the second skin 20 may be formed of a different material, and the first and/or second hinge member may be formed of a different material than the first skin 18 and/or the second skin 20.

FIG. 7 shows a portion of the cowl 440 (FIG. 6) illustrating a plurality of hinge members coupling the first skin 18 to the second skin 20. The hinge members comprise first hinge members 32 that may be movably (e.g., hingedly coupled 88 or rigidly coupled 86) (FIG. 30) to the first skin 18 at a first skin joint 40. The hinge members also comprise a second hinge member 42 that may be movably coupled (e.g., hingedly coupled 88 or rigidly coupled 86) to the second skin 20 at a second skin joint 50. The first hinge members 32 and the second hinge members 42 may be movably coupled (e.g., hingedly coupled 88 or rigidly coupled 86) to one another at a member joint 52 located between the first and second skin 18, 20. Each set of first and second hinge member 32, 42 collectively forms a hinge assembly 30. In the example shown in FIG. 7, the hinge assemblies 30 are arranged in series along a transverse 116 direction or circumferential 118 direction of the sandwich structure 10. Although shown as being aligned with the first and second transverse stiffeners 24, 28, the hinge assemblies 30 may be offset from the first and second transverse stiffeners 24, 28 and are not necessarily mounted along the transverse stiffeners 24, 28. The hinge assemblies 30 are also shown as being mounted in opposing, back-to-back 92 arrangement to one another. However, the sandwich structure 10 may include individual hinge assemblies (not shown) that may be standalone hinge assemblies without any opposing hinge assembly mounted thereto.

In FIG. 7, each one of the first and second hinge members 32, 42 may be comprised of two or more bars 60 that may be mounted to the first skin 18 or the second skin 20 to form a triangular subassembly 62. The triangular subassembly 62 of the first hinge member 32 may be coupled to a triangular subassembly 62 of the second hinge member 42 at a member joint 52 to form a truss structure 58 as a pyramidal assembly 66. The sandwich structure 10 may include a plurality of pyramidal assemblies 66. For example, the sandwich structure 10 may include a plurality of pyramidal assemblies 66 extending in a circumferential 118 direction or any other direction and may couple the first skin 18 to the second skin 20. In an embodiment, a series of pyramidal assemblies 66 may be mounted to the first and second transverse stiffeners 24, 28. Although FIG. 7 illustrates the hinge members formed as bars 60, the hinge members may be formed in alternative embodiments such as shear panels 80 (FIG. 28), as unitary hinge structures 280 (FIGS. 53-65 and 69-70), or in other embodiments.

In FIG. 7, the second longitudinal stiffeners 26 are shown as having a relatively greater height than the first longitudinal stiffeners 22. However, the first and second longitudinal stiffeners 22, 26 may each be formed at any height. Likewise, the first and second transverse stiffeners 22, 24, 26, 28 may be formed at different heights or at the same height. The height of the stiffeners 22, 24, 26, 28 may be selected based upon the stiffness requirements in the given longitudinal 112 and transverse 116/circumferential 118 directions. In addition, although the first and second longitudinal stiffeners 22, 26 are shown as being positioned directly opposite one another, the first and second longitudinal stiffeners 22, 26 may be located at any position relative to one another. Likewise, the first and second transverse stiffeners 24, 28 may be located at any position relative to one another and are not necessarily aligned with one another. It should also be noted that the sandwich structure 10 is not limited to stiffeners oriented in the longitudinal 112 or transverse 116 direction but may include stiffeners oriented in any direction such as in diagonal directions relative to a longitudinal axis.

Figure 8:
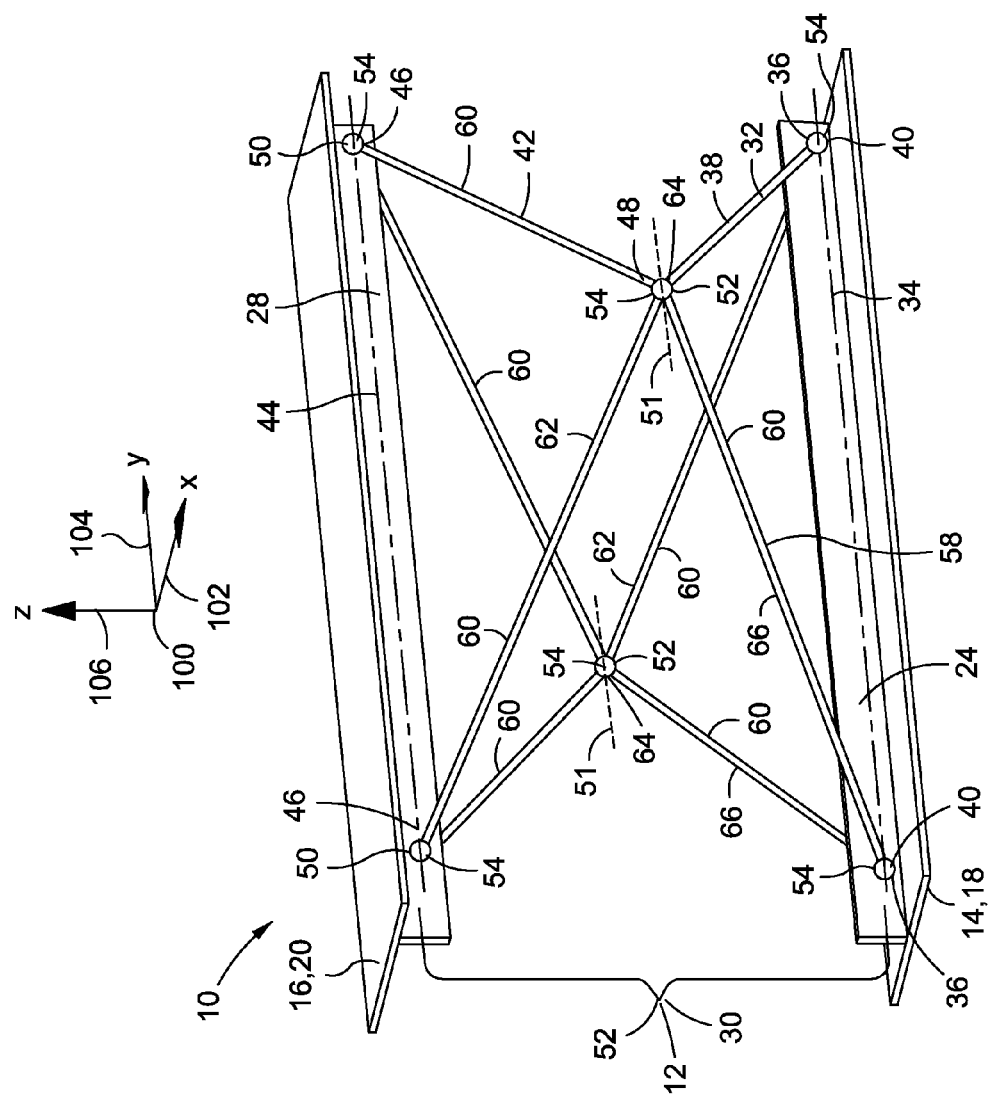
FIG. 8 is a perspective illustration of a truss structure embodiment of the hinge members.

In FIG. 8, shown is a perspective illustration of a portion of a first skin 18 (FIG. 6) and a portion of a second skin 20 (FIG. 6) coupled by a pair of back-to-back 92 hinge assemblies 30. Each hinge assembly 30 is shown formed as a pyramidal assembly 66 as described above. The first skin 18 may include a first transverse stiffener 24 and the second skin 20 may include a second transverse stiffener 28. In each one of the triangular subassemblies 62, each bar 60 may have a proximal end 36, 46 and a distal end 38, 48. The proximal end 36, 46 of one or more of the bars 60 may be coupled to a corresponding one of the first and second skins 18, 20, or the proximal end 36, 46 of one or more of the bars 60 may be coupled to a corresponding one of the first and second transverse stiffeners 24, 28. The distal end 38, 48 of each one of the bars 60 may be coupled to one another at a member joint 52 defining a junction 64.

The bars 60 of the triangular subassembly 62 may be comprised of solid rod, hollow tube, or any combination thereof. In addition, the bars 60 may be formed in any one of a variety of different cross-sectional sizes, shapes, and configurations. The bars 60 may be connected to the respective first and second skins 18, 20 at the first and second skin joint 40, 50 and/or to the first and second transverse stiffeners 24, 28 or first and/or first and second longitudinal stiffeners 22, 26 (FIG. 7) by any number of different joint configurations. In an embodiment, the first skin joint 40, the second skin joint 50, and/or the member joint 52 may be configured as a movable joint 54. For example, the first and second skin joint 40, 50 and/or the member joint 52 may be configured as a universal joint (not shown), a ball and socket (not shown), a single-clevis 72 (FIG. 7) or a dual-clevis 72 fitting as described below, or any one of a variety of other joint configurations or combinations thereof. Likewise the member joint 52 between first and second hinge members 32, 42 may be provided in any one of a variety of joint configurations, including the above-mentioned joint configurations for the first and second skin joint 40, 50. In addition, the first and second hinge members 32, 42 may be formed as a rigid joint 56 or a non-movable joint such as the rigid joint 56 included in a shear panel 80 embodiment illustrated in FIG. 30 and described below.

In FIG. 8, the first skin joint 40 may define a first axis 34. The second skin joint 50 may define a second axis 44. The member joint 52 between the first and second skin joint 40, 50 may define a member axis 51. The first axis 34, the second axis 44, and the member axis 51 may be substantially parallel to one another which may facilitate movement of the hinge members 32, 42. In an embodiment, at least one of the stiffeners 22, 24, 26, 28 (FIG. 7) may extend along a direction generally parallel to the first axis 34, the second axis 44, and the member axis 51. The orientation of the first and second axis 44 and the member axis 51 may define the transverse 116 direction of the sandwich structure 10. As was indicated above, the first skin 18 (FIG. 7) and second skin 20 (FIG. 7) may be substantially non-movable relative to one another in an in-plane 108 transverse 116 direction. The first skin 18 and second skin 20 may be movable relative to one another in an in-plane 108 longitudinal 112 direction. The longitudinal 112 direction may be substantially perpendicular to the first and second axis 44 of the shear structure 12. The first skin 18 and the second skin 20 may be movable in an out-of-plane 110 direction relative to one another in the vertical 120 direction or along a direction generally normal to the first skin 18 and the second skin 20.

FIGS. 9-11 illustrates the movement of the first skin 18 and second skin 20 in an out-of-plane 110 direction (FIG. 8) relative to one another. FIG. 9 illustrates the first and second skin 18, 20 in an initial position prior to the increasing the temperature of the first skin 18 relative to the second skin 20. FIG. 10 illustrates movement of the first skin 18 in an out-of-plane 110 direction relative to the second skin 20 as may occur during heating of the first skin 18 which may cause in-plane expansion 134 (FIG. 16) of the first skin 18 and may result in deflection of the first skin 18 in the out-of-plane 110 direction relative to the second skin 20. FIG. 11 illustrates a further amount of deflection of the first skin 18 in the out-of-plane 110 direction toward the second skin 20 as result of the differential heating of the first and second skins 18, 20. Advantageously, the shear structure 12 may be configured such that the first and second skin joint 40, 50 and the member joint 52 are configured as movable joints 54 (FIG. 8) that are substantially freely movable. In this regard, the shear structure 12 may provide radial isolation of the first skin 18 relative to the second skin 20. A small amount of friction may exist in the first skin joint 40, the second skin joint 50, and/or the member joint 52. Such friction may transmit a small amount of moment between the hinge members 32, 42 and the first and second skin 18, 20 and may provide a biasing force to urge the first and second skin 18, 20 away from one another. However, such an effect may be minimized by minimizing friction in the joints.

FIG. 12 is an end view of the sandwich structure 10 of the cowl 440 (FIG. 6) showing the hinge members 32, 42 movably coupled to the first and second skin 18, 20 at the first and second skin joints 40, 50. The hinge members 32, 42 may also be movably coupled to one another at the member joint 52. Advantageously, the first and second hinge members 32, 42 may be coupled to one another and to respective ones of the first skin 18 and second skin 20 such that the sandwich structure 10 has substantially zero or negligible shear stiffness in an in-plane 108 longitudinal 112 direction (FIG. 8). In this manner, the first skin 18 and second skin 20 may be movable relative to one another in the longitudinal 112 direction as indicated above. In addition, the sandwich structure 10 may be configured to provide relatively high shear stiffness in an in-plane 108 transverse 116 direction such that the first and second skin 18, 20 are substantially non-movable relative to one another in the transverse 116 direction (FIG. 8). The sandwich structure 10 may also provide relatively low extensional stiffness in a radial 122 direction (FIG. 8) or out-of-plane 110 direction (FIG. 11) such that the first and second skin 18, 20 are movable toward and away from one another in the out-of-plane 110 direction (e.g., along a direction normal to the in-plane 108 directions).

FIG. 13 is a simulation of the response of the sandwich structure 10 to a 600° F. temperature differential between the first and second skin 18, 20. In the simulation, the first skin 18 deflected 136 in an out-of-plane 110 direction or radial 122 direction toward the second skin 20 by approximately 0.080 inch from an original position 130 of the first skin 18 to a deflected position 132 of the first skin 18. Although not shown, during the simulation, an end of the exhaust cone 448 deflected in an in-plane 108 longitudinal 112 direction by approximately 0.20 inch. Advantageously, during the simulation, the second skin 20 remained stationary due to the relatively low extensional stiffness of the shear structure 12 in the out-of plane direction. In this regard, the non-movement of the second skin during differential heating of the sandwich structure 10 demonstrates the radial isolation between the first and second skin 18, 20 as provided by the shear structure 12.

Figure 14:
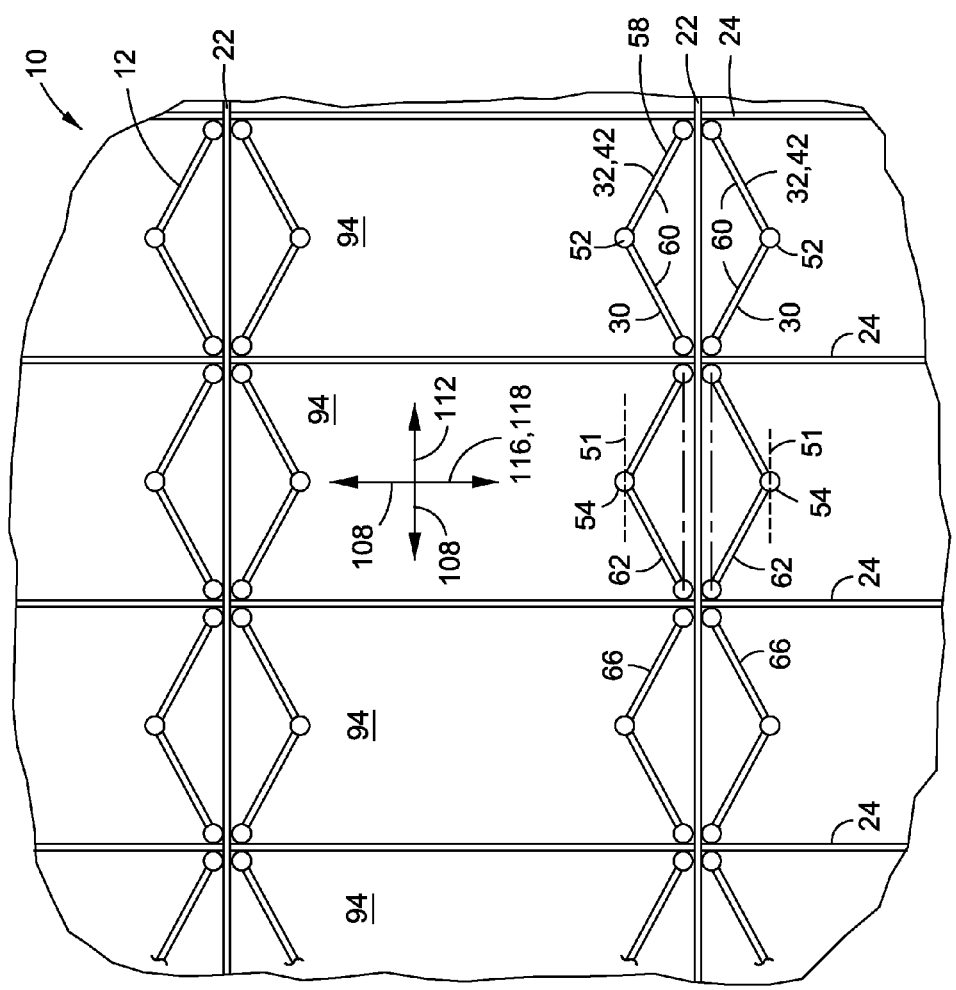
FIG. 14 is a top view of the sandwich structure taken along line 14 of FIG. 12 and illustrating the longitudinal stiffeners and the transverse stiffeners.

FIG. 14 is a top view of the sandwich structure 10 taken along line 14 of FIG. 12 and illustrating the first longitudinal stiffeners 22, the first transverse stiffeners 24, and a plurality of the hinge assemblies 30. In the embodiment shown, the hinge assemblies 30 are arranged generally in alignment with the transverse stiffeners as indicated above. The hinge assemblies 30 are positioned within a plurality of bays 94 defined by the spacing between adjacent pairs of the longitudinal stiffeners 22. However, the sandwich structure 10 may be configured such that a hinge assembly 30 spans across two or more bays 94. In this regard, one or more of the individual hinge assemblies 30 may straddle one or more of the longitudinal stiffeners 22.

FIGS. 15 to 17 illustrate the movement along an in-plane 108 longitudinal 112 direction of the first skin 18 relative to the second skin 20 simultaneous with relative movement of the first and second skin 18, 20 along an out-of-plane 110 direction. As indicated above, the first and second skin 18, 20 define the in-plane 108 direction. The out-of-plane 110 direction is oriented substantially normal to the in-plane 108 direction. The longitudinal 112 direction of the sandwich structure 10 is oriented substantially perpendicular 226 (FIG. 44) to the transverse 116 direction of the sandwich structure 10. The hinge assemblies 30 are arranged such that the first and second skins 18, 20 are relatively movable along the longitudinal 112 direction (e.g., in-plane direction), and are also relatively movable along the out-of plane 110 direction, and relatively non-movable along the in-plane 108 transverse 116 direction or circumferential 118 direction (e.g., in-plane direction) (FIG. 7).

FIG. 15 illustrates the first and second skin 18, 20 in an original position 130 (FIG. 13) prior to differential heating thereof. FIG. 16 shows movement of the first skin 18 relative to the second skin 20 along the in-plane 108 longitudinal 112 direction with simultaneous movement of the first skin 18 relative to the second skin 20 in the out-of-plane 110 direction. Such movement may occur due to heating of the first skin 18. FIG. 17 shows the effect of further temperature difference between the first and second skin 18, 20 causing additional movement of the first skin 18 relative to the second skin 20 along the in-plane 108 longitudinal 112 direction with additional movement or deflection of the first skin 18 relative to the second skin 20 in the out-of-plane 110 direction. As indicated above with regard to FIGS. 9-11, the shear structure 12 may advantageously be configured such that the first and second skin joint 40, 50 and the member joint 52 are configured as movable joints 54 that are substantially freely movable to radially isolate of the first skin 18 from the second skin 20 and minimize or prevent the occurrence of stress in the first and second skin 18, 20. FIGS. 16-17 additionally show rolling 138 movement of the hinge members 32, 42 in response to in-plane movement of the first skin 18 relative to the second skin 20 in the longitudinal direction. Rolling 138 movement of the hinge members 32, 42 corresponds to relatively low shear stiffness of the shear structure 12 in the longitudinal direction.

Figure 18:
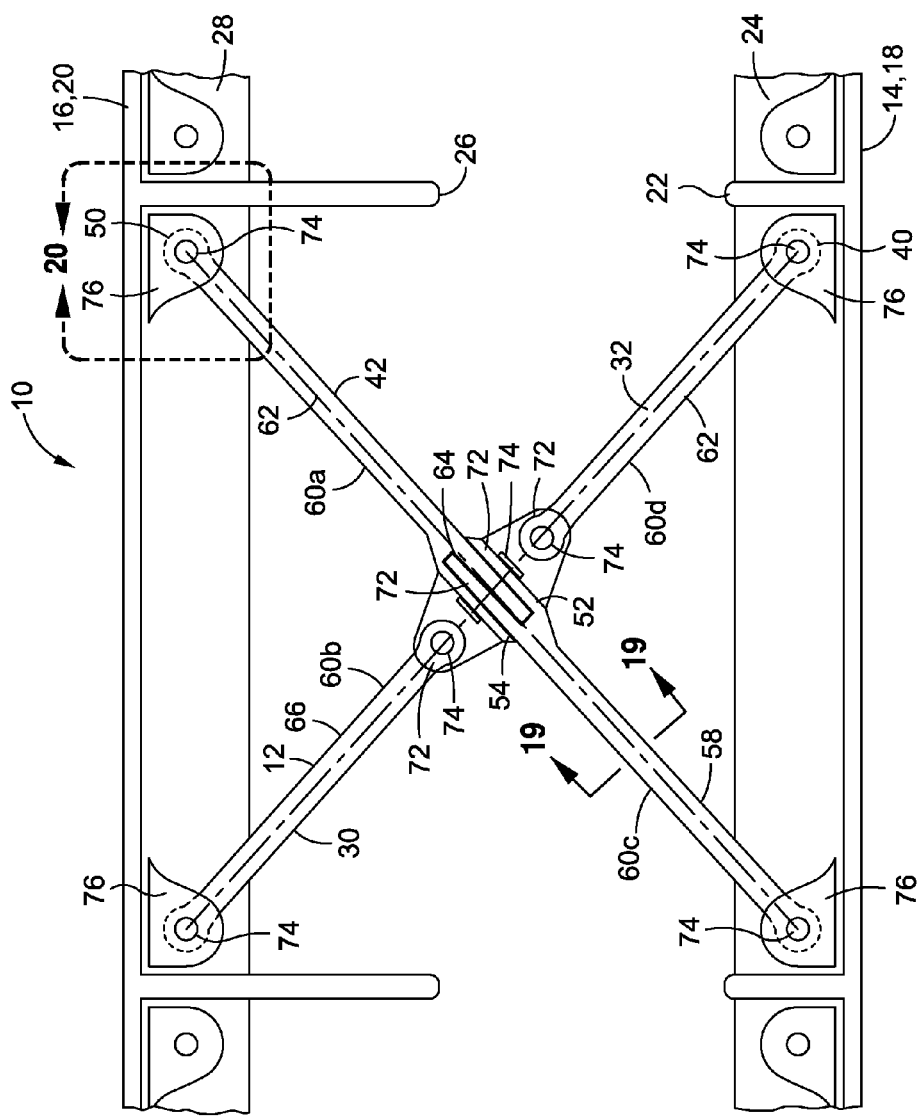
FIG. 18 is an end view of an embodiment of the shear structure wherein the hinge members are comprised of bars having clevis fittings.

FIG. 18 is an embodiment of the hinge members 32, 42 wherein the bars 60 include clevis 72 fittings for interconnection to one another and to a bracket 76 of the first and second skin 18, 20. The clevis 72 fittings may be arranged in a manner to facilitate relative movement of the first and second skin 18, 20 in an out-of-plane 110 direction and along an in-plane 108 longitudinal 112 direction. For example, the first bar 60a and the third bar 60c may be connected using two clevises 72 with a common pin 74 installed in holes through the clevises 72. Such an arrangement may allow the first skin 18 to move in an out-of-plane 110 direction relative to the second skin 20. The fourth bar 60d may be connected to only the third bar 60c using a clevis 72 and pin 74 configuration. The second bar 60b may be connected to only the first bar 60a also using a clevis 72 and pin 74 configuration.

FIG. 19 illustrates the interconnection of the second, third, and fourth bars 60b, 60c, 60d at the member joint 52. The second bar 60b and the fourth bar 60d complete the triangular subassemblies 62 and provide structural rigidity within the planes of each triangular subassembly 62. Advantageously, the arrangement of the pin-ended connections between the bars 60 and the first and second skin 18, 20 allow for relative movement of the first and second skin 18, 20 (FIG. 18) without inducing stress or strain in the connection at the end of each bar 60.

FIG. 20 illustrates the interconnection of the first bar 60a (FIG. 18) to the second skin 20 using a clevis 72 fitting and a similar connection of the bar 60 to the second skin 20 on an opposite side (e.g., right-hand side) of the longitudinal stiffener 26. In the embodiment shown, two sets of clevis 72 fittings are used to provide the required degrees-of-freedom of movement of the first bar 60a relative to the second skin 20. The clevis 72 fitting mounted to the second skin 20 allows relative movement of the first and second skin 18, 20 (FIG. 18) in an out-of-plane 110 direction. The clevis 72 fitting mounted on the first bar 60a allows relative movement along a circumferential 118 direction without inducing bending moments in the clevis 72 fitting mounted to the second skin 20 or in the clevis 72 fitting mounted to the first bar. The shear structure may also be provided in an embodiment having a single in-line joint (not shown) configured to interconnect clevis fittings (not shown) from both sides of the longitudinal stiffener 26.

Figure 21:
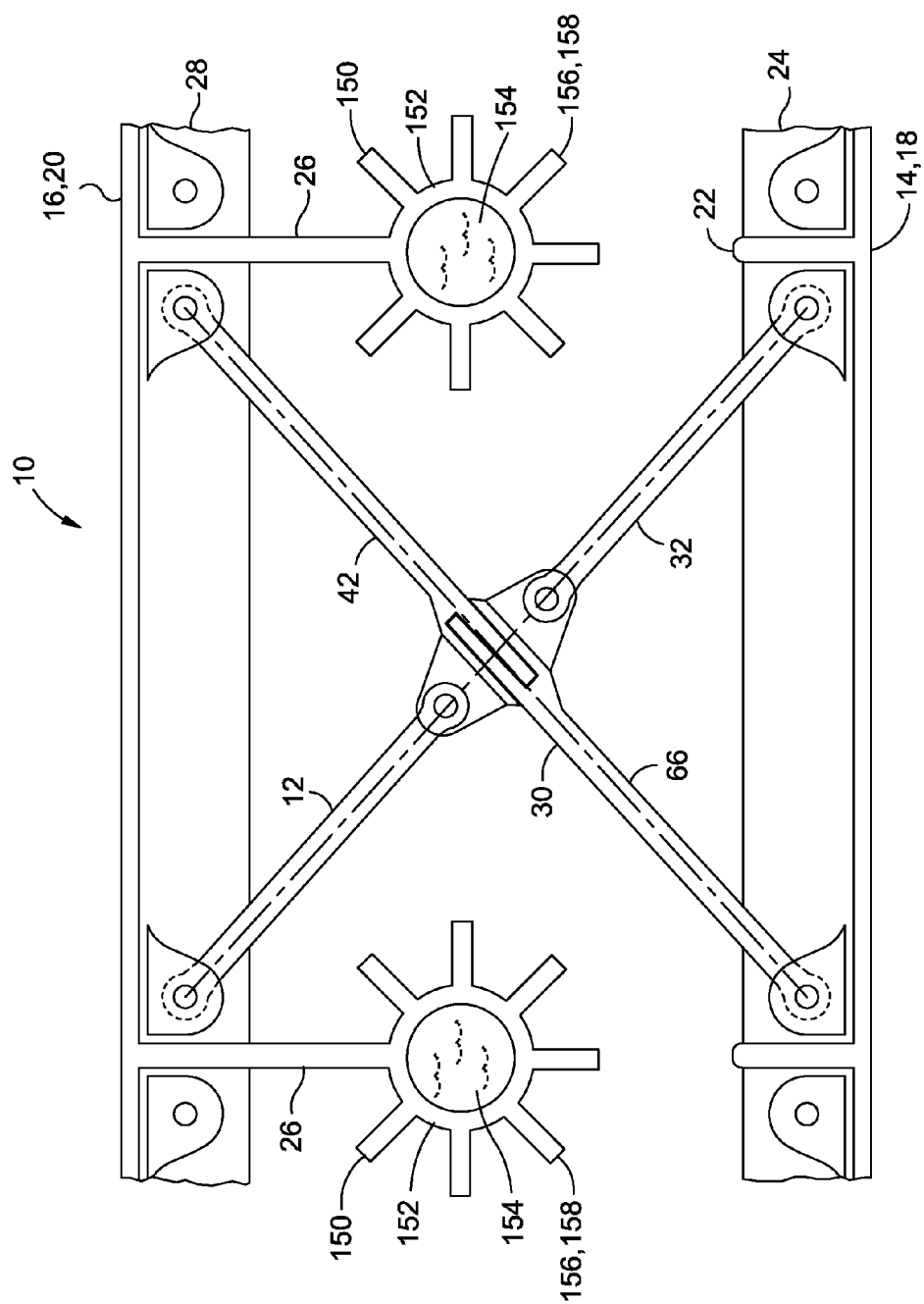
FIG. 21 is an end view of an embodiment of the shear structure incorporating a temperature management system comprising hollow tubes for circulating coolant.

FIG. 21 shows a temperature management system 150 that may optionally be incorporated into the sandwich structure 10. The temperature management system 150 may be mounted within the sandwich structure such as between the first and second skins and may include one or more hollow tubes 152 for circulating coolant 154. The hollow tubes 152 may optionally include one or more fins 158 to act as heat sinks 156 to absorb heat from the interior of the sandwich structure 10. The coolant 154 may comprise an inert fluid such as a gas or a liquid such as liquid nitrogen. The liquid nitrogen may absorb heat radiated by the hot side 14 of the sandwich structure 10.

Figure 22:
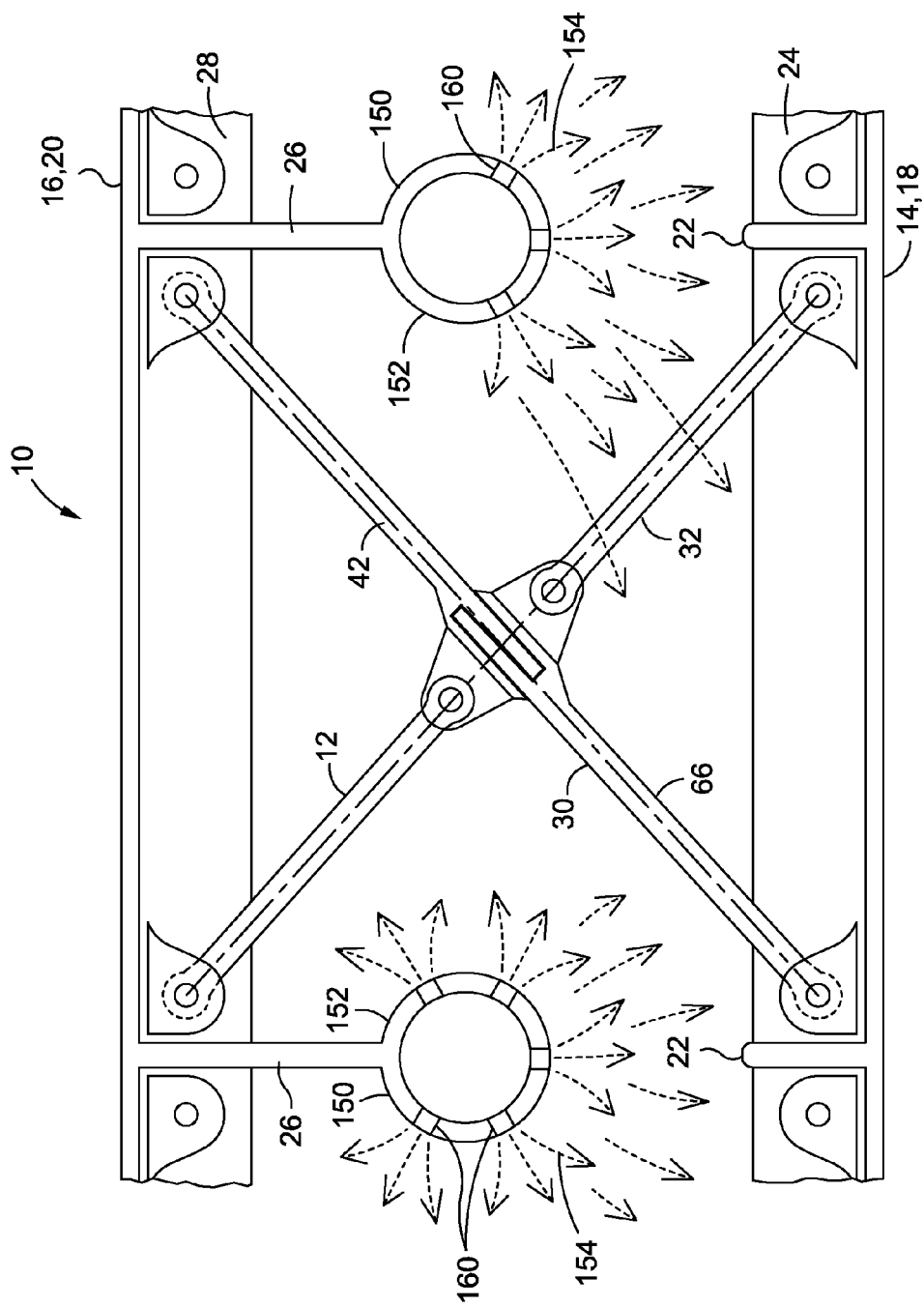
FIG. 22 is a view of an alternative embodiment of the temperature management system including a plurality of apertures formed in the hollow tubes for discharging coolant.

FIG. 22 shows an alternative embodiment of the temperature management system 150 wherein the hollow tubes 152 include a plurality of apertures 160 for discharging coolant 154 such as liquid nitrogen into the interior of the sandwich structure 10. The liquid nitrogen may absorb heat from the interior cavity of the sandwich structure 10 and thereby cool the sandwich structure 10. Although the temperature management system 150 is described in the context of liquid nitrogen, any fluid comprising any liquid or gas may be used as a coolant 154. For example, cold ambient air may be circulated through the hollow tubes 152. At cruising altitude of a commercial airliner, the relatively cold temperature of ambient air (e.g., minus 59 degrees Fahrenheit) may be circulated through the hollow tubes 152 for cooling the interior of the sandwich structure 10. For a hypersonic vehicle, atmospheric heating of an outer skin (not shown) of the vehicle may be used to heat a slush hydrogen system (not shown) to a temperature allowing the hydrogen to be circulated through hollow tubes 152.

FIG. 23 is a stress plot 170 of the second skin 20 (e.g., cold side 16) of the exhaust nozzle 434 in a simulated response to a 175-g acceleration 172 load imposed on the exhaust nozzle 434 along a vertical 120 direction (e.g., parallel to the z-axis). The relative magnitude 174 of the stresses in the stress plot 170 are shown in FIG. 24. The stress plot 170 of FIG. 23 illustrates relatively high magnitude stress concentrations in the second skin 20 on opposing lateral sides 188 of the exhaust cone 448 at support locations (not shown) for the second skin 20. Advantageously, the sandwich structure 10 provides a load path for the load from the mass of the second skin 20 under the 175-g acceleration 172. The load path moves along a circumferential 118 direction (FIG. 7) of the shear structure 12 (FIG. 22) into support locations at the lateral sides 188 of the second skin 20.

FIG. 25 is a stress plot 170 of the first skin 18 (e.g., hot side 14) of the exhaust nozzle 434 of FIG. 23 in response to the 175-g acceleration 172 (FIG. 23). The stress plot 170 of FIG. 25 has a relatively high magnitude stress concentration along the lateral sides 188 of the first skin 18 with reduced stress concentration along upper and lower portions of the exhaust cone 448. In FIG. 25, the first skin 18 is unrestrained in the vertical 120 direction (FIG. 8) such that the load from the mass of the first skin 18 transfers in a circumferential 118 direction (FIG. 8) through the shear structure 12 (FIG. 22) on each side of the second skin 20 (FIG. 23) and into the support locations (not shown). Advantageously, load transfer between the first and second skin 18, 20 is achieved by the relatively high shear stiffness provided by the sandwich structure 10 in the circumferential 118 direction. Although the second skin 20 is restrained in the simulation of FIGS. 23 and 25, the first skin 18 (FIG. 25) may optionally be restrained (not shown).

FIG. 26 is a stress plot 170 of the first skin 18 and the second skin 20 of the exhaust nozzle 434 (FIG. 3) in a simulated response to a 600° F. temperature differential applied to the first and second skin 18, 20. As shown, the temperature differential across the first and second skin 18, 20 results in relatively low magnitude stress 184 in the exhaust cone 448. In the simulation, the stress may be less than 1 psi (e.g., effectively zero). The effectively zero stress is due to the relatively low or negligible shear stiffness in the shear structure 12 (FIG. 22) in the in-plane 108 (FIG. 7) longitudinal 112 direction (FIG. 7) and the relatively low extensional stiffness of the shear structure 12 in the out-of-plane 110 direction (FIG. 7). Such low stiffness facilitates relative movement of the first and second skin 18, 20 in the in-plane 108 longitudinal 112 direction and in the radial 122 direction (FIG. 7) in response to thermal expansion of the first skin 18. Advantageously, the hinge members 32, 42 are configured to undergo rolling movement in the longitudinal 112 direction similar to that which is illustrated in FIGS. 15-17 to minimize stress in the first and/or second skin 18, 20.

FIG. 27 shows a model 190 of an embodiment of the cowl 440 incorporating hinge members 32, 42 (FIG. 15) configured as shear panels 80. In FIG. 27, the second skin 20 (e.g., cold side 16) is removed to illustrate the shear structure 12. The first skin 18 (e.g. hot side 14) has first longitudinal stiffeners 22 and first transverse stiffeners 24 mounted thereto or integrated therewith. The shear panels 80 are incorporated into the shear structure 12 and may be mounted between the stiffeners 22, 24, 26, 28.

Figure 29:
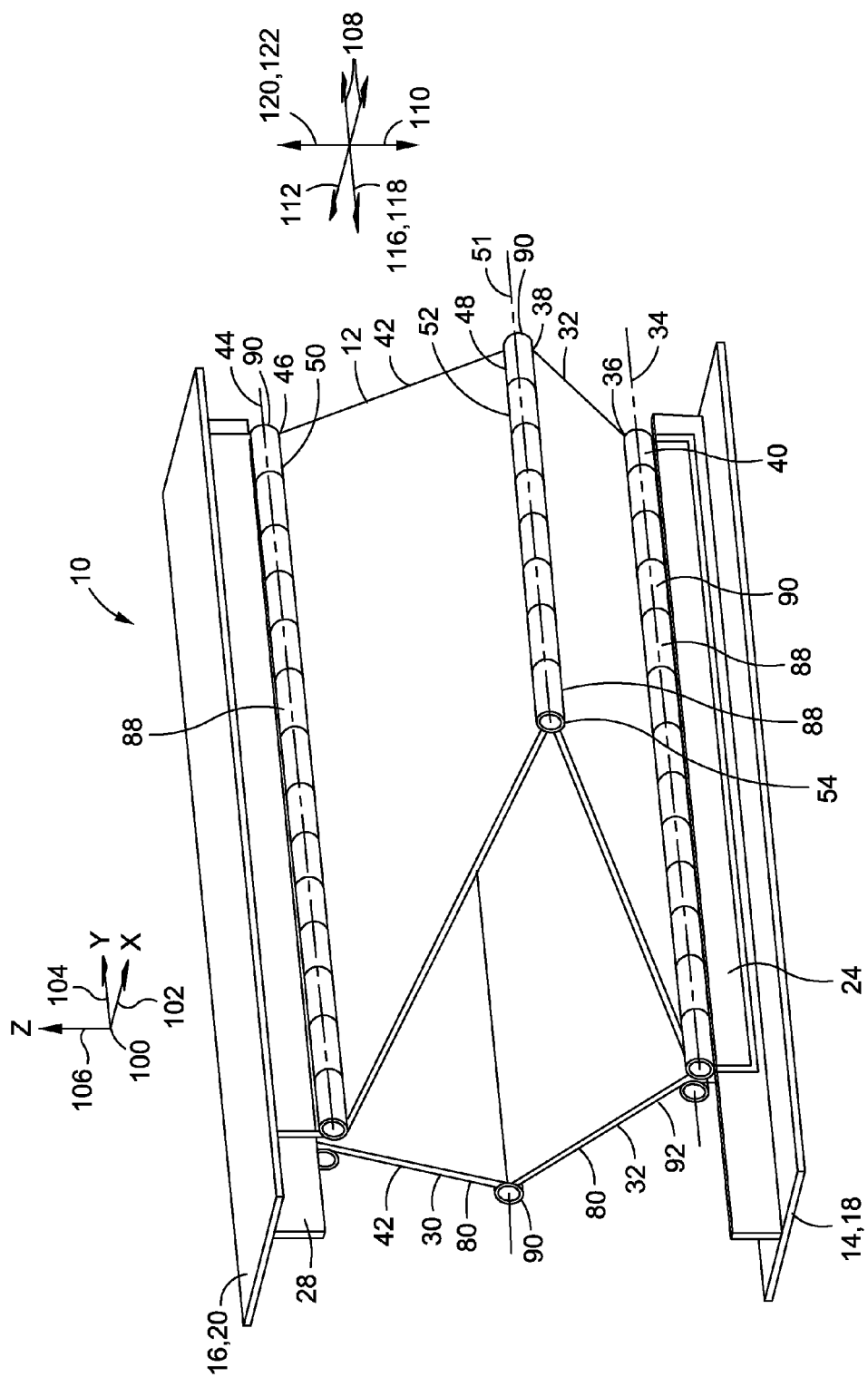
FIG. 29 is a perspective illustration of an embodiment of the sandwich structure having shear panels hingedly coupled to the first and second skin and to one another.

FIG. 28 shows the hinge members 32, 42 as shear panels 80 interconnecting the first and second skin 18, 20. The first and second longitudinal stiffeners 22, 26 and the first and second transverse stiffeners 24, 28 are arranged in a manner similar to that which was described above for the shear structure 12 illustrated in FIG. 7. As shown in FIG. 29, each shear panel 80 has a proximal end 36, 46 and a distal end 38, 48. The proximal end 36, 46 of each shear panel 80 may be connected to the first skin 18 or the second skin 20 at a respective first skin joint 40 and a second skin joint 50. The shear panels 80 may also optionally be connected to the longitudinal and/or transverse stiffeners at the first and second skin joints 40, 50. The distal end 38, 48 of each shear panel 80 is connected to the distal end 38, 48 of the opposing shear panel 80 at the member joint 52.

FIG. 29 shows an embodiment of the sandwich structure 10 wherein the first and second hinge members 32, 42 are formed as shear panels 80 having a trapezoidal configuration and being hingedly coupled 88 to the first and second skin 18, 20 and to one another. The proximal end 36, 46 of the shear panels 80 are pivotally connected to the respective first and second skin 18, 20 using a movable joint 54 such as a pivoting hinge 90 at each one of the first and second skin joints 40, 50. The pivoting hinge 90 may minimize spring stiffness that may otherwise occur with a rigid connection of the shear panels 80 to the first and second skin 18, 20 and to one another.

In FIG. 29, the distal end 38, 48 of the shear panels 80 may be pivotally connected to one another using a movable joint 54 such as a pivoting hinge 90 or other pivoting mechanism at the member joint 52. The first skin joint 40 and the second skin joint 50 may be oriented in parallel arrangement to the member joint 52 to facilitate out-of-plane 110 movement of the first skin 18 relative to the second skin 20 and to facilitate movement of the first skin 18 relative to the second skin 20 along an in-plane 108 longitudinal 112 direction. Due to friction in the pivoting hinge 90, the embodiment of FIG. 29 may provide a reduced level of radial isolation of the first skin 18 relative to the second skin 20 as compared to the level of radial isolation provided by the pyramidal assemblies 66 of bars 60 as described above and shown in FIG. 8.

Figure 30:
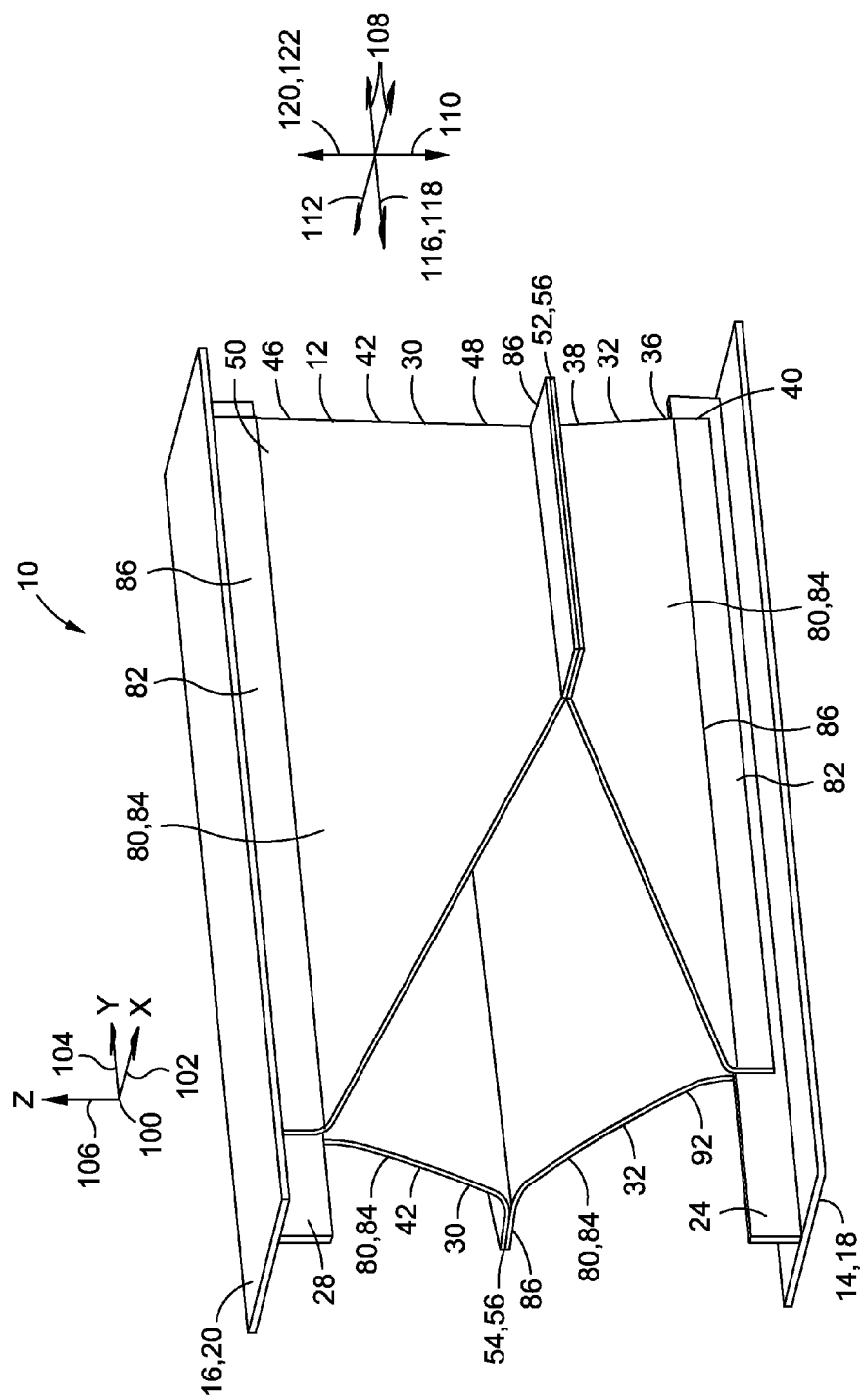
FIG. 30 is a perspective illustration of an embodiment of the sandwich structure wherein the shear panels are rigidly coupled to the first and second skin and to one another.
Figure 31:
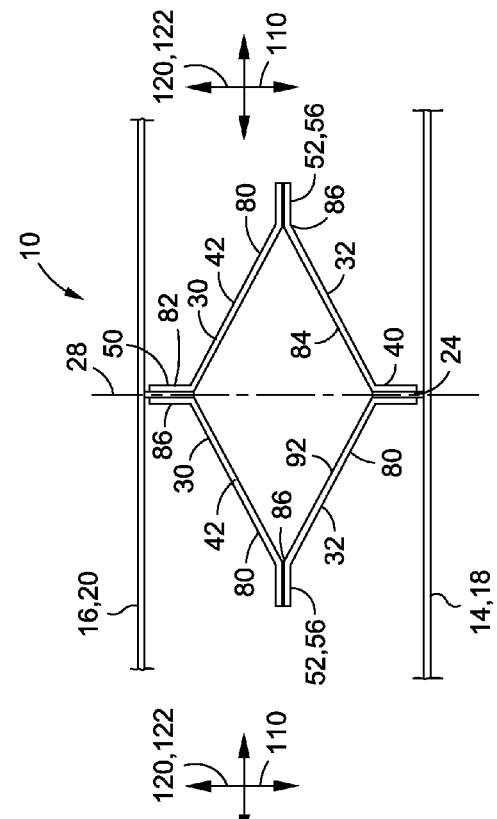
FIG. 31 is an end view of the sandwich structure of FIG. 30.

FIG. 30 shows an embodiment of the sandwich structure 10 wherein the shear panels 80 have a trapezoidal or tapered 84 configuration. The proximal end 36, 46 of the shear panels 80 are rigidly coupled 86 to the first and second skin 18, 20 at the first skin joint 40 and second skin joint 50. The distal end 38, 48 of the shear panels 80 are rigidly coupled 86 to one another. FIG. 31 is a side view of the embodiment of the sandwich structure 10 of FIG. 30 and illustrating attachment of the shear panels 80 to the first and second longitudinal stiffeners 22, 26 (FIG. 28) by means of flanges 82 on the shear panels 80. Advantageously, the embodiment of FIG. 30 provides a reduced level of complexity which may improve manufacturability as compared to the pyramidal assembly 66 (FIG. 8) embodiment of the shear structure 12 (FIG. 27).

Figure 32:
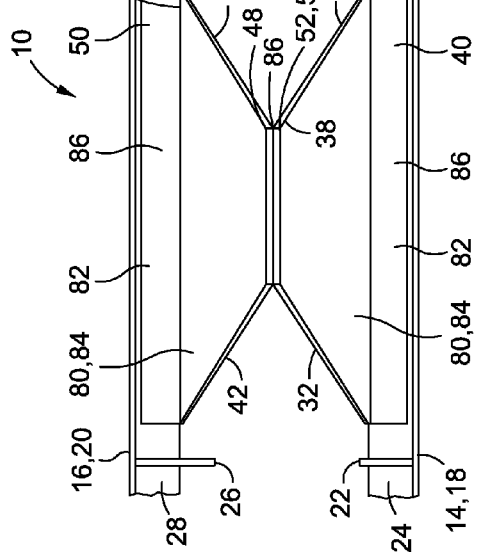
FIG. 32 is a side view of the sandwich structure taken along line 32 of FIG. 31 and illustrating the rigid coupling of the shear panels to the transverse stiffeners and to one another.

FIG. 32 is an end the view of the embodiment of the sandwich structure 10 of FIG. 30 and illustrating the rigid coupling of the shear panels 80 to one another along the member joint 52. A pair of the first and second hinge members 32, 42 on each side of the transverse stiffeners 24, 28 comprises a single hinge assembly 30. FIG. 32 illustrates a pair of hinge assemblies 30 mounted in back-to-back 92 arrangement wherein the flanges 82 of the hinge assemblies 30 are attached to the transverse stiffeners 24, 28. However, the flanges 82 may optionally be attached to the first and second skin 18, 20. Although FIG. 32 illustrates a pair of the hinge assemblies 30 oriented in back-to-back 92 arrangement, the sandwich structure 10 may be constructed such that only a single one of the hinge assemblies 30 is provided on only one side of the transverse stiffeners as was described above with regard to the truss structure 58 (FIG. 19) embodiment of the shear structure 12 (FIG. 27).

Figure 33:
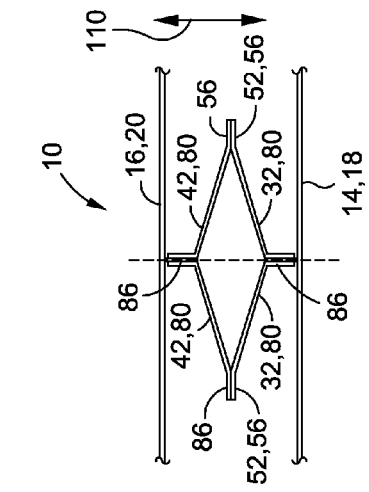
FIG. 33 is a side view of the shear structure with the first and second skin separated by an original distance prior to differential heating.
Figure 34:
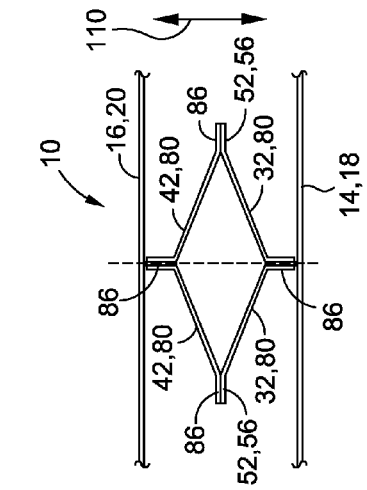
FIG. 34 is a side view of the shear structure with the first and second skin separated by a reduced distance as a result of out-of-plane deflection and further illustrating rolling movement of the hinge members as a result of in-plane deflection in the longitudinal direction.
Figure 35:
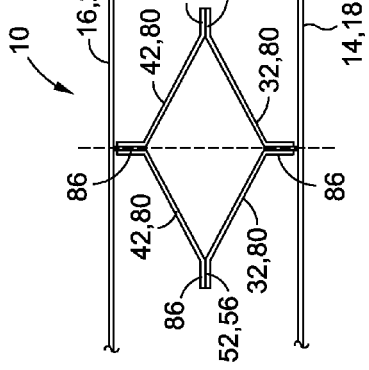
FIG. 35 is a side view of the shear structure with the first and second skin separated by an even further reduced distance as a result of out-of-plane deflection and further rolling movement of the hinge members.

FIG. 33 shows the sandwich structure 10 in an undeflected position. FIG. 34 illustrates the deflection of the first skin 18 relative to the second skin 20 in an out-of-plane 110 direction (e.g., a radial 122 direction) (FIG. 32). Although FIG. 34 shows the shear panels 80 maintaining a generally planar shape, the resisting force in the shear panels 80 may result in bending of the shear panels 80 into a curved shape (not shown) when the first skin 18 moves relative to the second skin 20 in an out-of-plane 110 direction. FIG. 35 illustrates further deflection of the first skin 18 relative to the second skin 20 in the out-of-plane 110 direction.

In the embodiment of FIG. 33, the rigid coupling of the shear panels 80 to the first and second skin 18, 20 and to one another at the member joint 52 may result in a resistive force (not shown) being generated in the out-of-plane 110 direction (FIG. 32) or radial 122 direction (FIG. 32). The magnitude of the resistive force may be proportional to the bending stiffness of the shear panels 80. The bending stiffness of the shear panels 80 may be related to the thickness of the shear panels 80, the height of the of the shear panels 80 in the radial 122 direction, the width of the shear panels 80 along the transverse 116 direction (FIG. 7), and the modulus of elasticity of the shear panels 80. The most influential of the above-noted factors may be the panel thickness of the shear panels 80. In this regard, a shear panel 80 having a relatively large width and a relatively small panel thickness may provide less resistive force in the radial 122 direction compared to the resistive force provided by a shear panel 80 having a relatively small width and a relatively large panel thickness as described in greater detail below.

In FIG. 33, the resistive force due to the rigid coupling of the shear panels 80 may generate a small degree of strain and associated stress in the first and second skin 18, 20. For shear panel 80 embodiments of the sandwich structure 10 wherein the first skin 18 is constructed of a different material (e.g., ceramic matrix composite material) than the second skin 20 (e.g., titanium), each one of the shear panels 80 may induce strain and stresses in the other shear panel 80 in response to changes in temperature of the first skin 18 relative to the second skin 20. Such strains and stresses in the shear panels 80 may also result in strains and stresses in the first skin 18 and second skin 20 during differential heating or differential temperatures of the first skin 18 relative to the second skin 20. Such strains and stresses may be reduced by minimizing the length of the member joint 52 coupling the shear panels 80 together. In this regard, the embodiment of the sandwich structure 10 illustrated in FIG. 33 may provide a reduced amount of radial isolation of the first skin 18 relative to the second skin 20 as compared to the hingedly coupled 88 shear panel 80 (FIG. 29) embodiment or the pyramidal assembly 66 (FIG. 8) embodiment.

Figure 37:
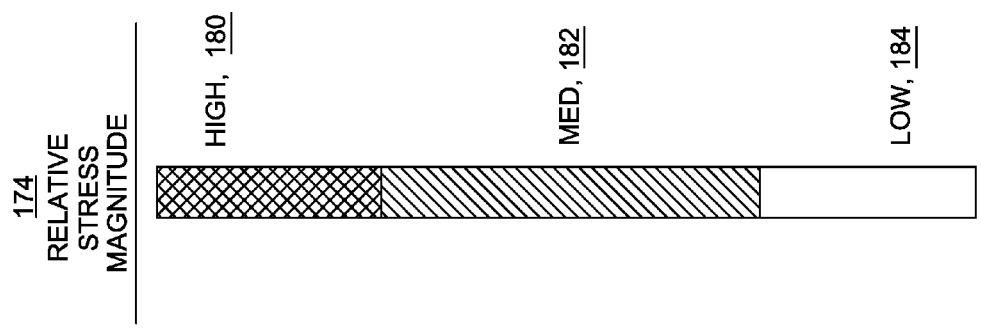
FIG. 37 is a legend of stress corresponding to the stress plot of FIG. 36.
Figure 36:
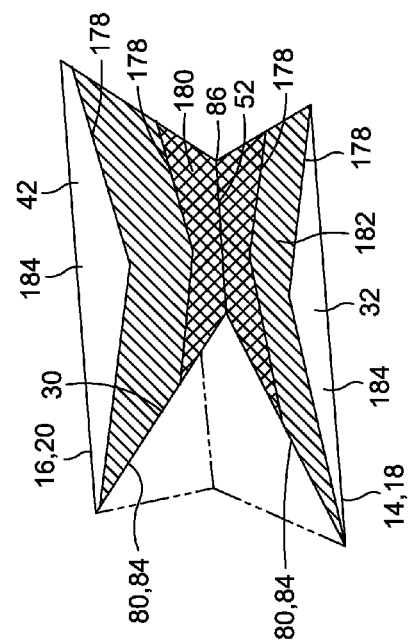
FIG. 36 is a perspective illustration of a stress plot of the shear panels of dissimilar material in response to a 600° F. temperature differential between the first and second skin.

Referring to FIGS. 36-37, shown in FIG. 37 is a stress plot of the first and second hinge members 32, 42 of the tapered 84 shear panels 80 for the embodiment shown in FIG. 30 and illustrating stress contours 178. FIG. 37 is a legend of the relative magnitudes 174 of von Mises stress plotted on the stress plot of FIG. 36. The stress plot of FIG. 36 is representative of the response of the shear panels 80 to a 600° F. temperature differential across the first and second skin 18, 20. The stress plot illustrates a relatively high 180 magnitude stress concentration at the location of the member joint 52 of the shear panels 80 and a medium stress concentration 182 moving away from the member joint 52. The high stress concentration 180 occurs along the member joint 52 as a result of dissimilar materials in the shear panel 80 of the first and second hinge members 32, 42.

It should be noted that any of the sandwich structure embodiments disclosed herein may be provided in a stacked arrangement (not shown) having multiple skins and wherein each opposing pair of skins (not shown) may be coupled by one or more of the shear structures (not shown). Advantageously, such a stacked arrangement may facilitate the thermal isolation of a hot side skin (e.g., exposed to an external heat source) located on an outermost side of the stacked arrangement from a cold side skin located on an opposite outermost side of the stacked arrangement. The skins and/or the hinge members (not shown) of such a stacked arrangement may be formed of different materials. For example, the outermost skins (not shown) of such a stacked arrangement may be formed of materials having relatively high-temperature capability such as ceramic material, titanium, inconel, or other materials. The innermost skins (e.g., located between the outermost skins) of such a stacked arrangement may be formed of materials having lower-temperature capability (e.g., aluminum and other materials) than the outermost skins. In an embodiment, a temperature management system such as the above-described temperature management system illustrated in FIG. 21-22 or other temperature management system embodiments may be incorporated into such a sandwich structure to provide passive or active cooling of the interior of the sandwich structure to improve the thermal isolation capabilities of the stacked arrangement.

Figure 38:
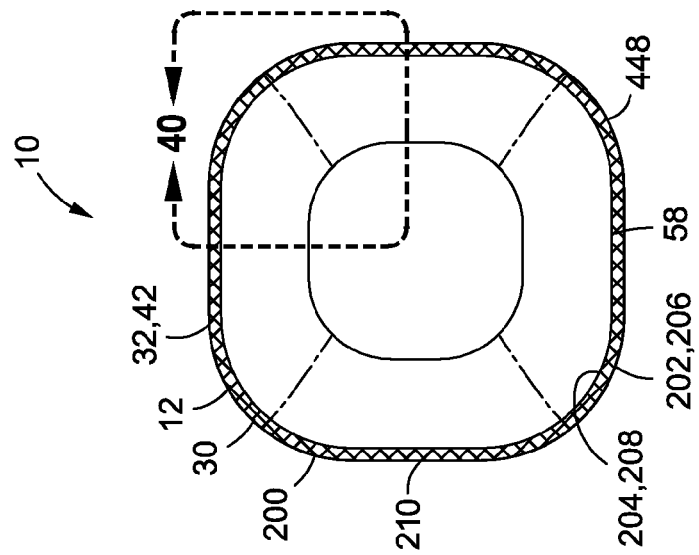
FIG. 38 is a perspective illustration of a stress plot of an exhaust cone having a non-circular section and illustrating stress concentrations in the first skin due to non-alignment of the hinge members with a deflection trajectory of the first skin during differential heating.
Figure 39:
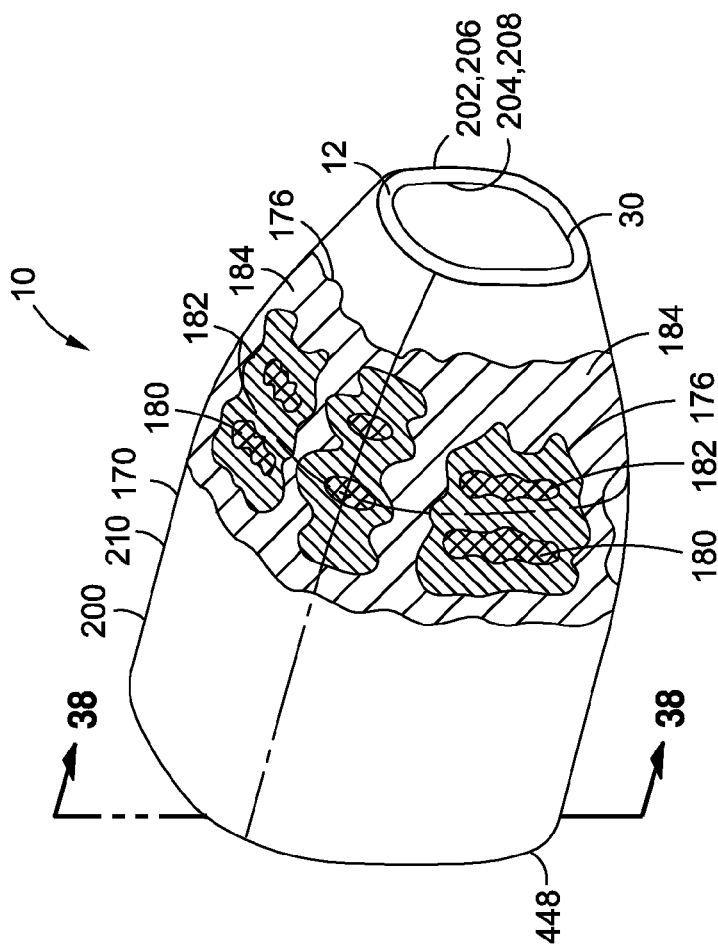
FIG. 39 is an end the view of the exhaust cone of FIG. 38.

FIG. 38 is an illustration of a model 210 of an exhaust cone 448 having a cross-sectional shape formed as a rounded square to illustrate the implementation of the sandwich structure 10 in a non-circular section 200. The exhaust cone 448 with non-circular section 200 illustrated in FIG. 38 incorporates a truss structure 58 (FIGS. 7-8). The stress in the stress plot represents strain and stress that occurs in the first skin 202 (e.g., hot side 206) and second skin 204 (e.g., cold side 208) as result of differential heating of the non-circular section 200. Localized stress concentrations may occur at locations around the exhaust cone 448 corresponding to the location of attachment of the hinge members 32, 42 (FIG. 40) to the first and second skin 202, 204. The localized stress concentrations may occur as a result of misalignment of the hinge assemblies 30 with a deflection trajectory 218 (FIG. 41) of the expanding first skin 202. FIG. 39 is an end view of the exhaust cone 448 of FIG. 38 illustrating the non-circular section 200 of the exhaust cone 448. Also shown is the shear structure 12 configured as a plurality of hinge members 32, 42 coupling the first skin 202 to the second skin 204.

Referring to FIGS. 40-45, shown in FIG. 40 is an end view of a portion of the exhaust cone 448 (FIG. 38) illustrating a plurality of the hinge members 32, 42 interconnecting the first and second skin 202, 204. The hinge members 32, 42 are shown as a plurality of pyramidal assemblies 66 (FIG. 8). In FIG. 40, the first skin 202 is shown in an original 212 position. FIG. 41 is an end view of the exhaust cone 448 illustrating the first skin 202 in the original 212 position and in a deflected 214 position in response to differential heating of the first and second skin 202, 204. Also shown in FIG. 41 are a plurality of deflection trajectories 218 of the first skin 202. Each one of the deflection trajectories 218 represents the trajectory of a tracking point 216 on the first skin 202 as the first skin 202 moves from the original 212 position to the deflected 214 position in response to differential heating or other causes. FIG. 41 illustrates a non-common 220 origin of the deflection trajectories 218 of tracking points 216. The non-common origin 220 of the deflection trajectories 218 is associated with the localized stress concentrations in the first and second skin 202, 204. In this regard, the stress concentrations in the first and second skin 202, 204 are due to misalignment of the hinge assemblies 30 with the deflection trajectories 218 as may occur in a non-circular section 200.

Figure 42:
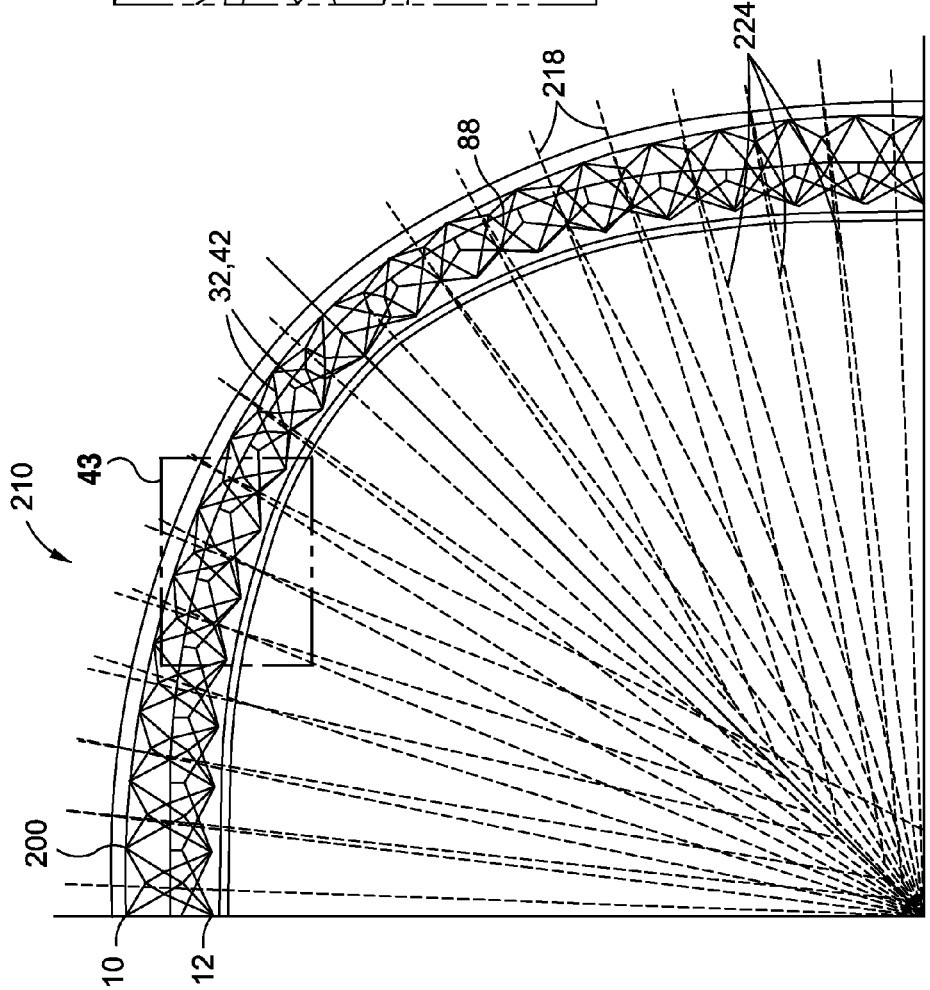
FIG. 42 is an end view of the portion of the exhaust cone of FIG. 41 showing a plurality of revised hinge alignment vectors superimposed over a corresponding plurality of the deflection trajectories illustrated in FIG. 41.

FIG. 42 is an end view of the exhaust cone 448 (FIG. 38) showing a plurality of revised hinge alignment vectors 224. Each revised hinge alignment vector 224 corresponds to one of the tracking points 216 (FIG. 41) of the first skin 202. In FIG. 42, the revised hinge alignment vectors 224 are superimposed over the corresponding deflection trajectories 218. The revised hinge alignment vectors 224 represent a desired orientation of the hinge members 32, 42. In this regard, alignment of the hinge members 32, 42 with the revised hinge alignment vector 224 may allow the first skin 202 to follow the direction of the revised hinge alignment vector 224 during differential heating of the sandwich structure. By following the revised hinge alignment vector, stress and/or mechanical strain may be eliminated from the first and/or second skin 204 during differential heating of the non-circular section 200.

Figure 43:
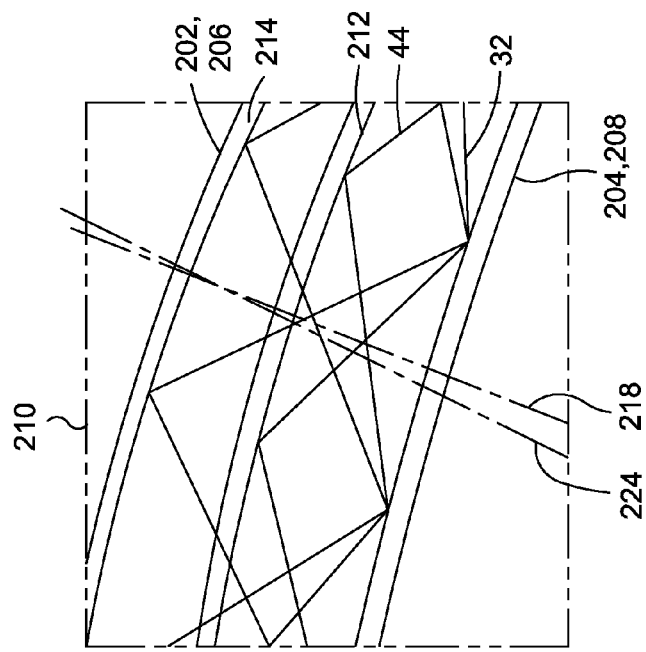
FIG. 43 is enlarged view of a portion of the exhaust cone of FIG. 42 illustrating the orientation of one of the revised hinge alignment vectors in relation to the original deflection trajectory.

FIG. 43 shows a portion of the exhaust cone 448 (FIG. 38) and the orientation of the revised hinge alignment vector 224 in relation to the original 212 deflection trajectory 218 at one location on the exhaust cone 448. As indicated above, by adjusting the orientation of the hinge members 32, 42 to be aligned with the revised hinge alignment vector, stress and/or strain in the first skin 202 and/or second skin 204 may be reduced or eliminated. FIG. 44 shows the hinge members 32, 42 in an original 212 orientation and wherein the hinge members 32, 42 are attached to the first transverse stiffener and the second transverse stiffener which are respectively mounted to the first and second skin 202, 204. In the original orientation, the member axis 51 of the hinge members 32, 42 is oriented perpendicularly relative to the original hinge alignment vector 222.

FIG. 45 shows the hinge members 32, 42 reoriented such that the member axis 51 of the hinge members 32, 42 are aligned with (e.g., are oriented perpendicular 226 to) the revised hinge alignment vector. With the hinge members 32, 42 being reoriented, the first skin 202 may isotropically expand under differential heating of the sandwich structure 10 without generating significant stress and strain in the non-circular section 200. FIG. 45 shows an embodiment wherein the first and second transverse stiffeners 24', 28' may be modified to correspond to the reorientation of the hinge members 32, 34.

With regard to the general arrangement of the hinge members in the sandwich structure 10, it should be noted that the hinge members 32, 42 (FIG. 43) are not limited to an orientation providing stiffness in a circumferential 118 direction (FIG. 7) and minimizing or preventing stiffness in other directions. For example, the hinge members 32, 42 may be arranged to provide substantial shear stiffness in the in-plane 108 (FIG. 7) longitudinal 112 direction (FIG. 7) and minimizing shear stiffness in an in-plane circumferential 118 direction while allowing movement of the first skin 202 (FIG. 44) relative to the second skin 204 (FIG. 44) in an out-of-plane 110 direction (FIG. 7). Furthermore, the hinge members 32, 42 may be located in a combination of orientations and are not limited to a single orientation throughout the sandwich structure 10 (FIG. 42). For example, the hinge members 32, 42 may be oriented to provide longitudinal shear stiffness at a center of a structure or vehicle where bending loads are highest. However, at other locations such as at the extremities of the vehicle, the hinge members 32, 42 may be mounted in an orientation that provides circumferential shear stiffness. As may be appreciated, the hinge members 32, 42 may be mounted in any one of a variety of different orientations at any location in a structure.

Referring to FIGS. 46-47, shown in FIG. 46 is a side view of a launch vehicle 230 that may incorporate the sandwich structure 10. The launch vehicle 230 may include one or more propellant tanks 232 which may be attached to the vehicle structure 238 by means of one or more conventional Y-joints 246. The propellant tanks may contain propellant 244 such as cryogenic propellant or other propellant. In an embodiment, the propellant tanks 232 may contain liquid hydrogen or liquid oxygen. The propellant tanks 232 may be pressurized and/or may undergo a change in internal pressure such as during heating or cooling of the propellant 244 within the tanks 232. In FIG. 47, the propellant tank 232 may include a cylindrical tank wall 240 and having a dome 242 mounted on the end of the cylindrical tank 232.

Referring to FIGS. 48-49, shown in FIG. 48 is a cross-sectional view of a conventional Y-joint 246 as may be used for attaching the propellant tank 232 to a forward skirt 234 and an aft skirt 236 of the launch vehicle 230 in a conventional manner. The skirts 234, 236 may be formed as a monocoque structure (not shown) or as a sandwich panel having an outer skin 250 and an inner skin 248 separated by a core 252. At the Y-joint 246, the tank dome 242 may be adhesively bonded to the vehicle structure 238 along a length 256 of a bondline 254 (FIG. 48). Unfortunately, a change in internal pressure of the cryogenic tank 232 relative to the vehicle structure 238 may cause the tank wall to expand such as in the circumferential direction and which may result in local shear peaking at the extreme ends of the bondline 254 in the conventional Y-joint 246. Such shear peaking may approach the strength limits of the bondline 254 adhesive. FIG. 49 shows a plot of shear stress 258 in the bondline 254 vs. location along a length 256 of the bondline 254 and illustrating local shear peaking 260 due to differential heating of the cryogenic tank 232 relative to the vehicle structure 238.

Referring to FIGS. 51-52, shown in FIG. 50 is a cross-sectional view of an advantageous embodiment incorporating a shear structure 12 between the vehicle structure 238 and the tank 232. In the embodiment shown, the shear structure 12 comprises a plurality of hinge members 32, 42 for attachment 262 of the tank 232 to the vehicle structure 238. The hinge members 32, 42 are shown oriented in a manner facilitating out-of-plane movement of the first skin 18 (e.g., the tank wall 240) relative to the second skin 20 (e.g., the vehicle structure 238). The hinge members 32, 42 may be oriented in alignment with an axial direction of the launch vehicle 230. The axial direction of the launch vehicle 230 may comprise the direction along which the primary vehicle loads act. The tank wall may expand or contract in an in-plane direction or circumferential direction such as in response to a change in internal pressure of the tank as may be caused by heating or cooling of the propellant. Advantageously, the hinge members 32, 42, which may be configured as shear panels 80, may minimize or prevent local shear peaking along a length of attachment of the tank 232 to the vehicle structure 238 by allowing the tank wall 240 (e.g. first skin) to expand or contract and move toward or away from the vehicle structure 238 (e.g., second skin). Although not shown in FIG. 50, the hinge members 32, 42 may also be configured as pyramidal assemblies (not shown) or in other embodiments described above.

FIG. 51 is a plot of stress vs. location for the attachment scheme shown in FIG. 50. FIG. 51 illustrates a relatively constant shear stress advantageously occurring along the length of attachment 264 of the hinge members 32, 42. Furthermore, FIG. 51 illustrates the possible tuning 266 of the stress level along a length of the attachment 264 between the tank 232 and the vehicle structure 238 by tailoring the shear stiffness in the hinge members 32, 42 at a given location along the length of the attachment 264. For example, in FIG. 50, the hinge members 32, 42 on the extreme left side of the attachment 264 may be provided in a relatively short width for a rigid joint of the hinge members 32, 42 and which may minimize extensional stiffness of the hinge members 32, 42 in the out-of-plane or through-thickness direction relative to the extensional stiffness at other locations along the attachment 264. For example, at the right hand side of the attachment 264, the hinge members 32, 42 may have a greater width which may provide an increased level of extensional stiffness at that location. By adjusting the geometry of the hinge members 32, 42, shear stress may be tuned for a given location along the attachment 264 between the propellant tank 232 and the vehicle structure 238.

In FIG. 52, shown is an alternative embodiment of the attachment 264 of the propellant tank 232 to the vehicle structure 238. FIG. 52 illustrates different configurations of the hinge members 32, 42 for attachment 262 of the tank 232 to the vehicle structure 238. The different configurations of the hinge members 32, 42 provide different levels of stiffness between the first skin 18 and the second skin 20. For example, on the left-hand-side of the length of attachment 264 in FIG. 52, the hinge members 32, 42 may have straight sides. At the right-hand-side of the length of attachment 264 in FIG. 52, the hinge members 32, 42 may be configured as tapered 84 shear panels 80 to provide a smaller width at a vertex 288 of the shear panels 80 to reduce the extensional stiffness in the attachment 264 between the tank 232 and the vehicle structure 238. In addition to longitudinally-oriented 268 hinge members 32, 42, FIG. 52 illustrates circumferentially-oriented 270 hinge members 32, 42 on a right-hand side of the attachment 264 and wherein the circumferentially-oriented 270 hinge members 32, 42 provide circumferential stiffness between the propellant tank 232 and the vehicle structure 238. Circumferential stiffness in the attachment 264 may advantageously reduce or prevent relative movement of the tank 232 and vehicle structure 238 along a circumferential direction.

Figure 55:
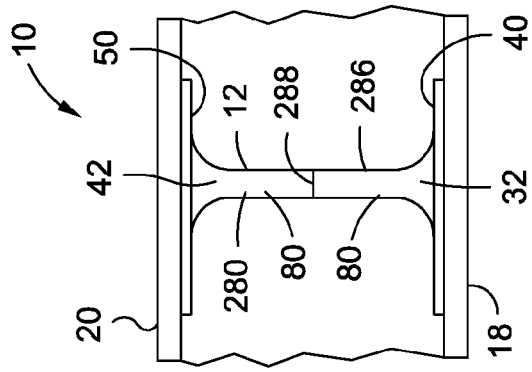
FIG. 55 is an end view of an additional embodiment of a unitary hinge structure having straight edges.
Figure 53:
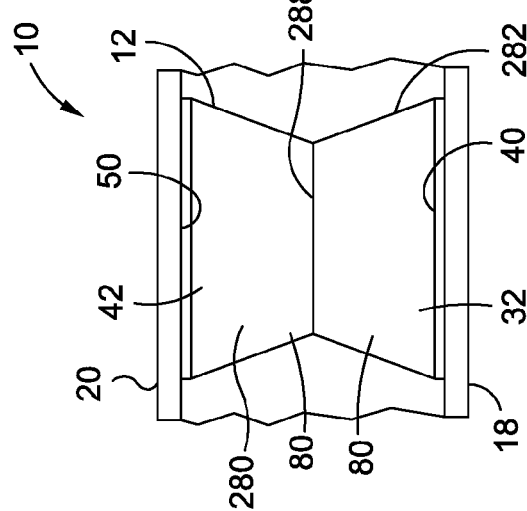
FIG. 53 is an end view of an embodiment of a unitary hinge structure having tapered edges.

FIGS. 53-56 illustrate a unitary hinge structure 280 configuration with varying degrees of shear stiffness. In FIGS. 53-56, each hinge member comprises a first and second hinge member 32, 42 (e.g., upper portion and lower portion) which are integrally formed as the unitary hinge structure 280. The first and second hinge member 32, 42 are coupled to respective ones of the first and second skin 18, 20 at the corresponding first and second skin joint 40, 50. The first and second hinge members 32, 42 are integral with one another and may form a vertex 288 between the first and second skin joint 40, 50. The first and second hinge members 32, 42 in the unitary hinge structure 280 of FIG. 53 are configured as shear panels 80 having tapered edges 282. The vertex 288 of the unitary hinge structure 280 in FIG. 53 may be longer than the vertex 288 of the unitary hinge structure 280 in FIG. 54. In addition, the unitary hinge structure 280 in FIG. 54 may include scalloped edges 284 for reducing the shear stiffness of the hinge structure relative to the shear stiffness of the hinge structure of FIG. 53. FIG. 55 illustrates a further embodiment of the unitary hinge structure 280 having a further reduced length of the vertex 288 and having straight edges 286 for reduced shear stiffness.

Figure 56:
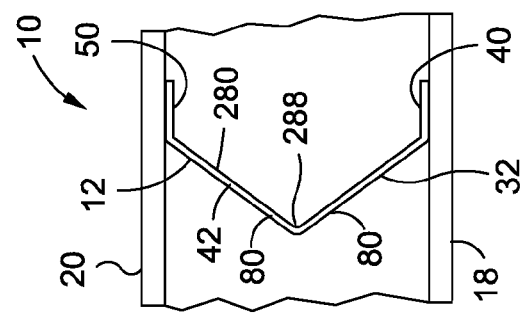
FIG. 56 is a side view of the unitary hinge structures shown in FIG. 53-55.
Figure 54:
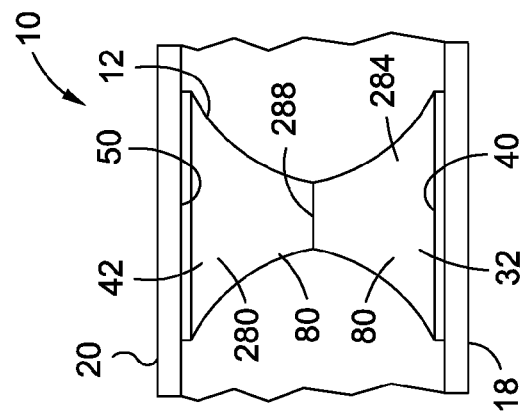
FIG. 54 is an end view of a further embodiment of a unitary hinge structure having scalloped edges.

FIG. 56 is a side view of the unitary hinge structure 280 shown in FIGS. 53-55. The unitary hinge structures 280 may include mounting flanges on upper and lower sides for directly connecting to the shear panels 80 to the first and second skin 18, 20. The mounting flanges may be attached to the first and second skin 18, 20 by mechanical fastening, adhesive bonding, or any other suitable method.

FIGS. 57-59 illustrate embodiments of the unitary hinge structure 280 having similar panel thicknesses 294 and being oriented at different panel angles 296. FIG. 57 illustrates a unitary hinge structure 280 having a relatively steep panel angle 296 which may provide a higher level of extensional stiffness in the out-of-plane direction relative to the level of extensional stiffness provided by the unitary hinge structure 280 of FIG. 58. The unitary hinge structure 280 of FIG. 58 is shown having a panel angle 296 that is less than the panel angle 296 of the unitary hinge structure 280 of FIG. 57. The unitary hinge structure 280 of FIG. 59 has a relatively shallow panel angle 296 which may provide a reduced level of extensional stiffness relative to the extensional stiffness that may be provided by the unitary hinge structures 280 of FIGS. 57 and 58.

FIGS. 60-62 illustrate embodiments of the unitary hinge structure 280 wherein the unitary hinge structures 280 are respectively provided with the same panel angles 296 as the unitary hinge structures 280 respectively shown in FIGS. 57-59. However, the unitary hinge structures 280 shown in FIGS. 60-62 have a reduced panel thickness 294 relative to the panel thickness 294 of the unitary hinge structure 280 shown in FIGS. 57-59. In this regard, the unitary hinge structures 280 shown in FIGS. 60-62 may provide reduced extensional stiffness relative to the extensional stiffness provided by the unitary hinge structures 280 shown in FIGS. 57-59.

FIGS. 63-65 illustrate further embodiments of the unitary hinge structure 280 wherein the unitary hinge structures 280 are respectively provided with the same panel angles 296 as the unitary hinge structures 280 shown in FIGS. 57-59. However, the embodiments shown in FIGS. 63-65 have a reduced panel thickness 294 relative to the panel thickness 294 of the unitary hinge structures 280 shown in FIGS. 57-62 such that the embodiments in FIGS. 63-65 have a reduced extensional stiffness.

Figure 66:
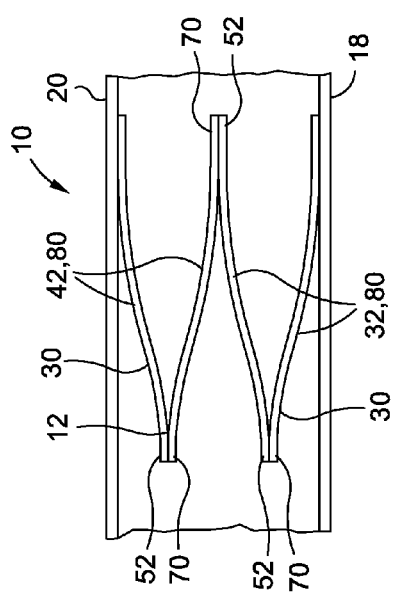
FIG. 66 is an end view of an embodiment of the shear structure comprising a pair of hinge assemblies mounted in a stacked arrangement.

FIG. 66 is an end view of an embodiment of the shear structure 12 comprising a pair of hinge assemblies 30 formed of individual first and second hinge members 32, 42. The hinge members are formed in a stacked 68 arrangement and are attached to the first and second skin 18, 20 by mounting flanges. The hinge members are rigidly coupled to one another by overlapping joints 70 by mechanical connection and/or adhesive bonding.

Figure 67:
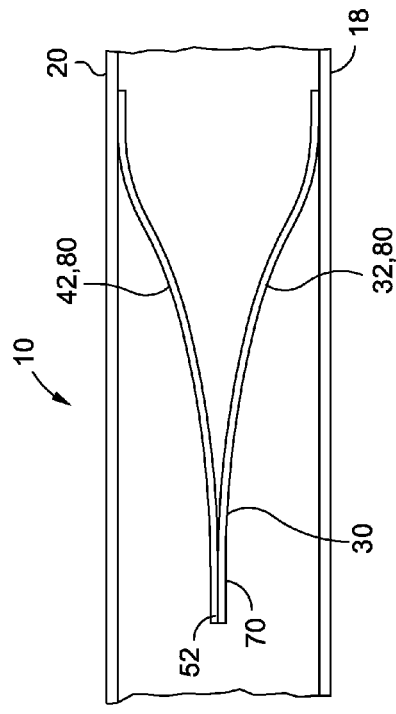
FIG. 67 is an end view of an embodiment of the shear structure comprising a single one of the hinge assemblies directly coupled to the first and second skin.
Figure 68:
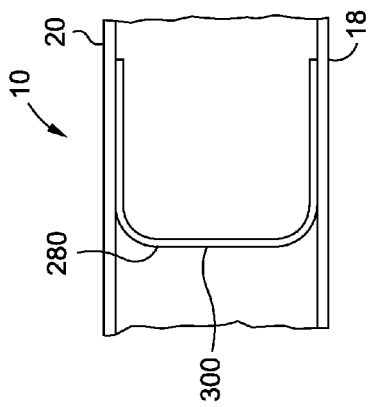
FIG. 68 is an end view of an embodiment of the shear structure having a reduced length relative to the embodiment shown in FIG. 67.

FIG. 67 is an end view of an embodiment of the shear structure 12 comprising a single one of the hinge assemblies 30. The hinge assembly 30 is comprised of first and the second hinge members rigidly coupled to one another at an overlapping joint 70. The first and second hinge members 32, 42 each include a mounting flange for directly coupling to the respective first and second skin 18, 20. For example, the mounting flanges in FIG. 67 may be bonded to the first and second skin 18, 20 or mechanically attached thereto or by a combination of adhesive bonding and mechanical attachment. FIG. 68 shows an embodiment of the shear structure 12 configured similar to the embodiment of FIG. 67. The embodiment in FIG. 68 is of shorter length which may result in a larger extensional stiffness than the embodiment shown in FIG. 67.

Figure 70:
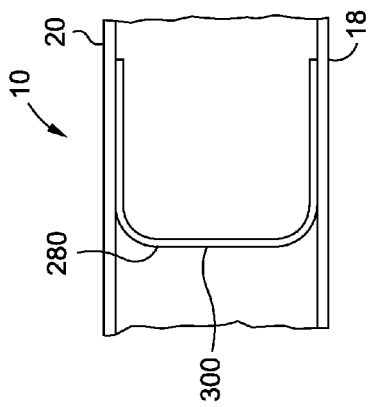
FIG. 70 is an end view of an embodiment of a unitary hinge structure having a vertical web extending between the first and second skin.
Figure 69:
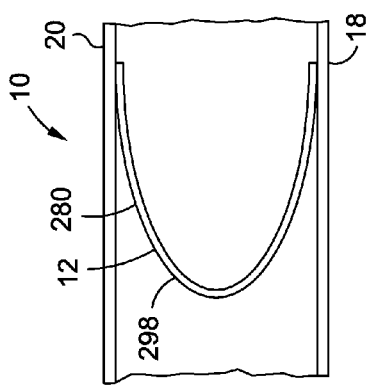
FIG. 69 is an end view of an embodiment of a unitary hinge structure having a continuous curvature between the first and second skin.

FIG. 69 is an end view of an embodiment of a unitary hinge structure 280 directly mounted to the first and second skin 18, 20 by means of mounting flanges. The unitary hinge structure 280 may have a continuous curvature 298 shape between the first and second skin 18, such as a generally elliptical shape. However, the unitary hinge structure 280 may be provided with alternative types of curvature including a substantially constant radius curvature. FIG. 70 shows an embodiment of a unitary hinge structure 280 having a vertical web 300 extending between the first and second skin 18, 20. The extensional stiffness of the unitary hinge structure 280 in FIG. 70 may be controlled by controlling the panel thickness in the vertical web 300. Due to the orientation of the vertical web 300, the unitary hinge structure 280 of FIG. 70 may provide a relatively high level of extensional stiffness and may therefore result in a high level of out-of-plane coupling of the first skin 18 to the second skin 20.

Figure 71:
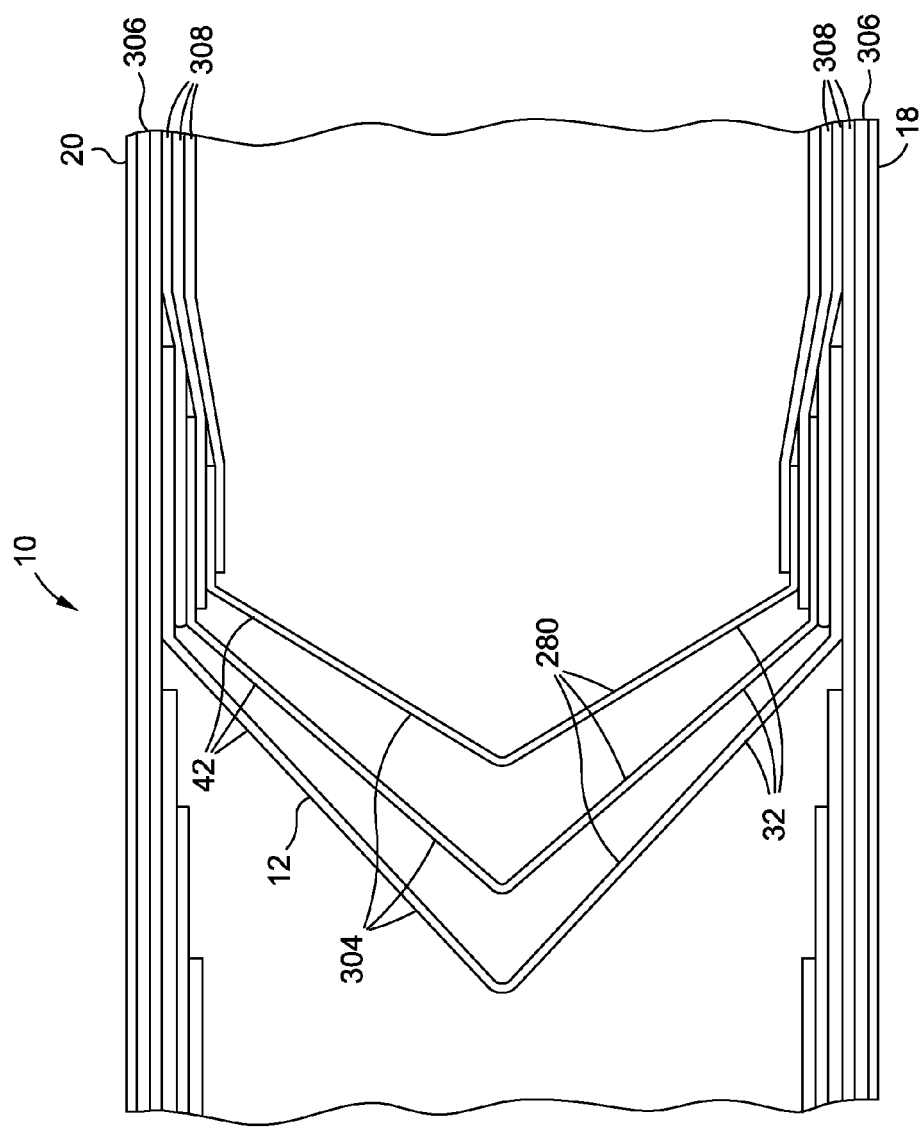
FIG. 71 is an end view of an embodiment of the shear structure comprising nested hinge members attached to the first and second skin by interleaving with plies of the first and second skin.

FIG. 71 is an end view of the shear structure 12 having a plurality of unitary hinge structures 280 arranged in nested 304 formation. In an embodiment, the sandwich structure 10 in FIG. 71 may include a composite 306 first skin 18 and a composite 306 second skin 20. Each one of the first and second skin 18, 20 may be formed of composite plies 308 that may be laminated together. For example, the first skin 18 and the second skin 20 may be formed of fiber-reinforced polymeric material or other suitable material including metallic and/or non-metallic material arranged in a ply stack. In addition, each one of the unitary hinge structures 280 may include a mounting flange that may be interleaved with the individual plies 308 that may make up the first skin 18 and the second skin 20. Advantageously, the nested 304 hinge members may provide a relatively high level of extensional stiffness between the first skin 18 and the second skin 20. Likewise, the nested 304 hinge members may provide a relatively high level of shear strength in the in-plane direction. In addition, it should be noted that the embodiment of the nested 304 unitary hinge structures 280 shown in FIG. 71 are idealized with regard to the ply 308 taper ratios of the ply 308 overlaps with the flanges of the nested 304 unitary hinge structures. In this regard, the ply 308 overlaps may be configured such that the ply 308 taper ratios are in the range of approximately 20:1 to 30:1 instead of the ply 308 taper ratios of 2:1 to 3:1 shown in FIG. 71. However, the overlap of the composite plies 308 with one another and with the flanges of one or more unitary hinge structures 280 may be provided in any taper ratio, without limitation.

In any of the embodiments of the sandwich structure 10 disclosed herein, the first skin 18 and the second skin 20 may be formed of any metallic or non-metallic material, without limitation. In an embodiment, the first skin 18 may be formed of a ceramic matrix composite material having favorable mechanical properties at elevated temperatures. However, the first skin 18 may be formed of a metallic material such as titanium, inconel, or other alloy having suitable mechanical properties. The second skin 20 may also be formed of a metallic material such as titanium, inconel, or other suitable material. However, the second skin 20 may be formed of ceramic matrix composite material or other non-metallic material. In any of the embodiments disclosed herein, the first and second skin 18, 20 may be formed of the same material or the first and second skin 18, 20 may be formed of different materials. As indicated above, the first and second hinge member, in any of the embodiments, may be formed of the same material as the respective first and second skin 18, 20. However, the first and second hinge member 32, 42 may be formed of a different material than the respective first and second skin 18, 20. Furthermore, the first and second hinge member 32, 42 may be formed of the same material which may be different than the material from which the first and second skins 18, 20 are formed.

Figure 72:
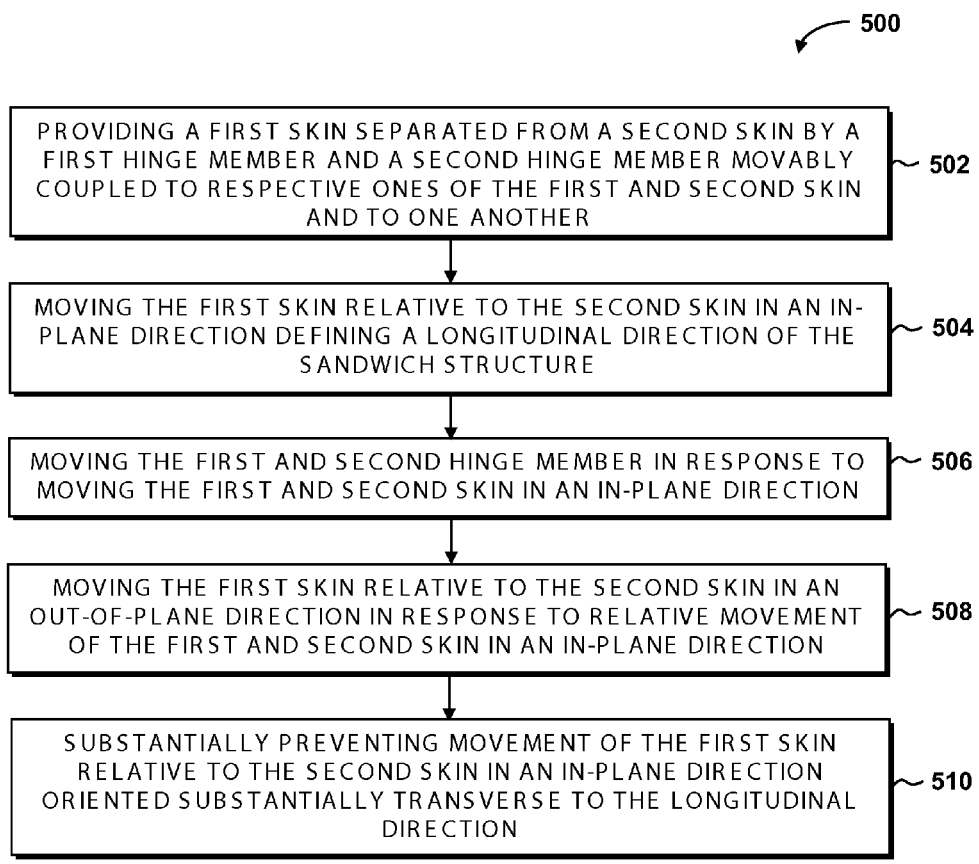
FIG. 72 is a flow diagram illustrating one or more operations that may be included in a method of minimizing loads in a sandwich structure.

FIG. 72 is a flow diagram illustrating one or more operations that may be implemented in a method 500 of minimizing thermal loads in a sandwich structure 10. The method 500 may be implemented in a process for providing an engine exhaust nozzle 434 (FIG. 3) for a jet engine, a rocket engine, or other high-temperature nozzle application for any type of vehicle. The method 500 may also be implemented in a process for providing a thermal protection system for a vehicle such as a hypersonic vehicle, a re-entry vehicle, or any other type of vehicle, without limitation. However, the method 500 is not limited to vehicles and may be implemented in any process requiring a high-strength, low weight sandwich structure 10 (FIG. 3) with shear stiffness in at least one in-plane 108 direction (FIG. 7) and reduced or minimal shear stiffness in an opposing (e.g., perpendicular 226) in-plane 108 direction and minimal shear stiffness in an out-of-plane 110 direction (FIG. 7).

Step 502 of the method 500 of FIG. 72 may include providing a first skin 18 separated from a second skin 20 by a first hinge member 32 (FIG. 3) and a second hinge member 42 movably coupled to respective ones of the first and second skin 18, 20 (FIG. 3) and to one another. Step 502 may optionally include stiffening the first and/or the second skin 20 using at least one stiffener such as by mounting, attaching, or integrating a longitudinal stiffener and/or a transverse stiffener into at least one of the first and/or second skin 20. However, the first and/or second skin 20 may be stiffened using stiffeners oriented in alternative directions and are not limited to stiffening using a longitudinal stiffener or a transverse stiffener.

Step 502 may further include rigidly coupling or hingedly coupling the first and second hinge member 32, 42 (FIG. 29) to the respective first and second skin 18, 20 at the respective first and second skin joint 40, 50 (FIG. 7). The first and second hinge members 32, 42 may also be rigidly or hingedly coupled 88 (FIG. 40) to one another at the member joint 52 (FIG. 29). For hinged coupling, the sandwich structure 10 may include a pivoting hinge 90 (FIG. 29) at the first skin joint 40 (FIG. 29), the second skin joint 50 (FIG. 29), and/or at the member joint 52. The first skin 18 (FIG. 29), the second skin 20 (FIG. 29), and the member joint 52 (FIG. 29) may define a first axis 34 (FIG. 29), a second axis 44 (FIG. 29), and a member axis 51 (FIG. 29). In an embodiment, the first axis 34, the second axis 44, and/or the member axis 51 may be substantially aligned with one another. For rigid coupling, the first and second hinge members 32, 42 may be rigidly attached to the respective first and second skin 18, 20 such as by mounting a flange 82 (FIG. 30) of the first and second hinge members 32, 42 directly to the first and second skin 18, 20 and/or to the first and/or second longitudinal or transverse stiffeners. The first and second hinge members 32, 42 may also be rigidly attached to one another at the member joint 52 located between the first and second skin joint 40, 50.

Step 504 of the method 500 may include moving the first skin 18 relative to the second skin 20 in an in-plane 108 direction (FIG. 30) comprising a longitudinal 112 direction (FIG. 30) of the sandwich structure 10 (FIG. 30). In an embodiment, relative movement of the first and second skin 18, 20 in the in-plane 108 longitudinal 112 direction may occur as a result of expanding the first skin 18 relative to the second skin 20 in response to differentially heating the first and second skin 18, 20. Such differential heating may occur during initial engine start-up of a gas turbine engine 416 (FIG. 1) wherein hot combustion gas 444 (FIG. 3) passes over the sandwich structure 10 of the cowl 440 (FIG. 3) and the exhaust cone 448 (FIG. 3) and causing differential heating of the cowl 440 and the exhaust cone 448. However, differential heating may occur as a result of other heating sources and/or as a result of cooling of one of the first and second skins 18, 20.

Step 506 of the method 500 may include moving the first and second hinge member 32, 42 (FIG. 7) in response to moving the first and second skin 18, 20 (FIG. 7) in an in-plane 108 direction (FIG. 7). The movement of the first and second hinge member 32, 42 may include rotating or pivoting the first and/or second hinge member about a respective first and second axis 44 (FIG. 8) and/or about the member axis 51 (FIG. 8). For example, FIGS. 15-17 illustrate movement of the first skin 18 relative to the second skin 20 along the in-plane 108 direction resulting in rolling 138 movement of the hinge assemblies 30. Movement of the first and second hinge member 32, 42 may additionally include bending (not shown) one or both of the first and second hinge members 32, 42 that may be rigidly coupled 86 to one another and to respective ones of the first and second skin 18, 20 as illustrated in FIGS. 30-35.

For rigid coupling, the first and/or second hinge member 32, 42 (FIG. 30) may be provided without a hinge mechanism at the first and second skin joint 40, 50 (FIG. 30) and/or at the member joint 52 (FIG. 30). The first and second hinge member 32, 42 may be configured to be bendable during out-of-plane movement of the first skin 18 relative to the second skin 20 and/or during relative movement in an in-plane 108 direction (FIG. 30) of the first and second skin 18, 20 along a longitudinal 112 direction (FIG. 30). For embodiments of the sandwich structure 10 (FIG. 30) having a unitary hinge structure 280 (e.g., FIGS. 53-65 and 69-70), movement of the unitary hinge structure 280 may comprise deflection or bending of the unitary hinge structure 280.

Step 508 of the method 500 may include moving the first skin 18 (FIG. 30) relative to the second skin 20 (FIG. 30) in an out-of-plane 110 direction (FIG. 30) in response to relative movement of the first and second skin 18, 20 in an in-plane 108 direction (FIG. 30). For example, FIGS. 9-11 illustrate deflection of the first skin 18 relative to the second skin 20 along an out-of-plane 110 direction. The deflection of first skin 18 relative the second skin 20 may result in a change in the spacing between the first skin 18 and second skin 20 such as for a closed cross-section 436. For example, heating of the first skin 18 (e.g., hot side 14) of the exhaust cone 448 (FIG. 38) may cause the first skin 18 to be deflected away from the second skin 20 as shown in FIGS. 40-41. However, heating of the first skin 18 of the cowl 440 may cause the first skin 18 to be deflected toward the second skin 20 as shown in FIG. 13.

Step 510 of the method 500 may include substantially preventing movement of the first skin 18 (FIG. 30) relative to the second skin 20 (FIG. 30) in an in-plane 108 transverse 116 direction (FIG. 30). Advantageously, the sandwich structure 10 (FIG. 30) is configured to provide a relatively high level of shear stiffness in at least one direction. In the embodiment disclosed herein, the sandwich structure 10 is configured to provide a relatively high level of shear stiffness in the transverse 116 or circumferential 118 direction (FIG. 30). The stress plot of the exhaust nozzle 434 in FIG. 25 graphically illustrates the circumferential shear stiffness provided by the sandwich structure 10 wherein the load (e.g., 175 g acceleration 172) from the mass of the first skin 18 transfers in a circumferential 118 direction (FIG. 30) through the shear structure 12 (FIG. 30) on each side of the second skin 20 and into the support locations (not shown) of the second skin 20 as described above.

Advantageously, the sandwich structure 10 (FIG. 30) provides a high-strength, low-weight means to couple the first skin 18 (FIG. 30) to the second skin 20 (FIG. 30) in a manner providing a relatively low level of extensional stiffness along an out-of-plane 110 direction (FIG. 30) while providing a substantially high level of shear stiffness along at least one in-plane 108 direction (FIG. 30) of the sandwich structure 10. The shear structure 12 (FIG. 30) that couples the first skin 18 to the second skin 20 may be provided in a variety of embodiments which may be selected based upon the amount of radial isolation desired in the out-of-plane 110 direction, the manufacturability of the sandwich structure 10, and other factors. For example, the above-described pyramidal assembly 66 or truss structure 58 of pin-ended beams 60 (e.g., FIG. 8) may provide a relatively high degree of radial isolation of the first skin 18 relative to the second skin 20 with relatively low or negligible extensional stiffness in the out-of plane direction.

Alternatively, the above-described shear panel 80 (FIG. 29) embodiments of the hinge members may provide a reduced level of radial isolation of the first skin 18 (FIG. 29) relative to the second skin 20 (FIG. 29). Advantageously, the level of radial isolation provided by the shear panel 80 embodiment may be designed into the hinge members 32, 42 (FIG. 29) based upon whether hinged coupling or rigid coupling is implemented in the connection of the shear panels 80 to one another and to the first and second skins 18, 20. The level of radial isolation may also be dictated by factors such as the panel thickness of the shear panels 80, the modulus of elasticity, the panel width, the panel angle 296 (FIGS. 57-59), and other factors. Advantageously, various combinations of hinged and rigid coupling may be implemented in the sandwich structure 10 (FIG. 29) to achieve the desired stiffness characteristics in the in-plane 108 transverse 116 and longitudinal 112 directions (FIG. 29) and in the out-of-plane 110 direction (FIG. 29).

The sandwich structure 10 may be implemented in any one of a variety of applications as indicated above. For example, the sandwich structure 10 may be implemented in a method of operating an aircraft engine such as the gas turbine engine 416 illustrated in FIG. 2. In this regard, the sandwich structure 10 (FIG. 7) may be implemented in the exhaust nozzle 434 wherein the sandwich structure 10 may have a first skin 18 (FIG. 7) separated from a second skin 20 (FIG. 7) by a first hinge member 32 (FIG. 7) and a second hinge member 42 (FIG. 7). The first and second hinge member 32, 42 may be movably coupled to respective ones of the first and second skin 18, 20 and to one another as described above.

The method of operating the engine may include causing the first skin 18 to move relative to the second skin 20 in an in-plane 108 direction (FIG. 7) defining a longitudinal 112 (FIG. 7) direction of the sandwich structure 10. Relative movement of the first and second skin 18, 20 in the in-plane 108 direction may occur as a result of differential heating of the first and second skin 18, 20 or as a result of differential coefficients of thermal expansion (CTE) of the first skin 18 relative to the second skin 20. For example, as described above, the first skin 18 (e.g., a hot side) of the exhaust nozzle 434 may be fabricated of ceramic material which may have a different coefficient of thermal expansion (CTE) than the second skin 20 (e.g. cold side) of the exhaust nozzle 434 which may be fabricated of titanium, inconel, or other material. The first and second hinge member 32, 42 may be movable in response to relative movement of the first and second skin 18, 20 in the in-plane 108 direction during operation of the engine. Advantageously, the first skin 18 may move relative to the second skin 20 in an out-of-plane 110 direction in response to relative movement of the first and second skin 18, 20 in the in-plane 108 direction. Such relative movement of the first and second skin 18, 20 in the out-of-plane 110 direction may minimize stress in the first and second skin 18, 20 as described above.

The present disclosure also includes a method of fabricating a sandwich structure 10 by configuring a first skin 18 (FIG. 7) in a manner to be separated from a second skin 20 (FIG. 7) by a first hinge member 32 (FIG. 7) and a second hinge member 42 (FIG. 7). The first and second hinge members 32, 42 may be movably coupled to respective ones of the first and second skin 18, 20 and to one another in a manner as described above. For example, the first skin 18 may be movable relative to the second skin 20 in an in-plane 108 (FIG. 7) direction defining a longitudinal 112 (FIG. 7) direction of the sandwich structure 10. In addition, the first and second hinge members 32, 42 may be movable in response to relative movement of the first and second skin 18, 20 in the in-plane 108 (FIG. 7) direction. The first skin 18 may be movable relative to the second skin 20 in an out-of-plane 110 direction in response to relative movement of the first and second skin 18, 20 in the in-plane 108 direction.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A sandwich structure, comprising:
    a first skin and a second skin arranged on top of one another and separated from one another by a hinge assembly sandwiched between the first and second skin to form the sandwich structure having a closed cross-section, the hinge assembly comprising;
    a first hinge member and a second hinge member each being configured as at least one of the following: a bar, and a shear panel;
    the first hinge member having a proximal end movably coupled to the first skin at a first skin joint;
    the second hinge member having a proximal end movably coupled to the second skin at a second skin joint;
    the first hinge member extending outwardly at a non-perpendicular angle from the first skin and terminating at a distal end;
    the second hinge member extending outwardly at a non-perpendicular angle from the second skin and terminating at a distal end;
    the distal end of the first hinge member being movably coupled to the distal end of the second hinge member at a member joint located between the first and second skin; and
    a plurality of movable joints connecting the proximal end of the first and second hinge member respectively to the first and second skin, and the member joint connecting the distal ends of the first and second hinge member to one another, the plurality of movable joints and the member joint being configured as hinged couplings including at least one of the following: a universal joint, a ball and socket, a clevis fitting, and a pivoting hinge;

the first skin is expandable relative to the second skin in a circumferential direction of the sandwich structure, the circumferential direction circumscribing a central axis;

the first and second hinge member moving in response to expansion of the first skin relative to second shin in the circumferential direction;

the first skin moving relative to the second skin in a radial direction in response to expansion of the first skin relative to the second skin in the circumferential direction;

the hinge assembly preventing movement of the first skin relative to the second skin in the circumferential direction while:

allowing movement of the first skin relative to the second skin in the radial direction; and allowing movement of the first skin relative to the second skin in a longitudinal direction, the longitudinal direction being parallel to the central axis.

2. The sandwich structure of claim 1, wherein:
the first and second skin joint respectively defining a first and second axis;
the member joint defining a member axis; and
the first axis, the second axis, and the member axis being substantially parallel to one another.

3. The sandwich structure of claim 1, wherein:
the first and second hinge member comprise the hinge assembly;
the sandwich structure including a pair of the hinge assemblies attached to the first and second skin; and
the pair of the hinge assemblies being mounted in back-to-back arrangement.

4. The sandwich structure of claim 1, wherein:
the first and second hinge member collectively comprise the hinge assembly; and
the hinge assemblies being arranged in series in the sandwich structure.

5. The sandwich structure of claim 1, wherein:
at least one of the first and second hinge member is comprised of at least two bars forming a triangular subassembly;
the at least two ban having a proximal end and a distal end;
the proximal end of each one of the bars being coupled to a corresponding one of the first and second skins at the corresponding first and second skin joint; and
the distal end of each one of the bars being coupled to one another at the member joint.

6. The sandwich structure of claim 5, wherein;
each one of the first and second hinge member comprises a triangular subassembly; and
the triangular subassemblies being coupled at the member joint and forming a pyramidal assembly.

7. The sandwich structure of claim 1, wherein;
at least one of the first and second skin has at least one stiffener mounted thereto; and
the stiffener comprising at least one of a longitudinal stiffener and a transverse stiffener.

8. The sandwich structure of claim 1, wherein:
the closed cross-section being a circular cross-section.

9. The sandwich structure of claim 1, wherein:
the hinge members are aligned with a deflection trajectory of the first skin as the first skin moves relative to the second skin in response to differential heating of the first and second skin.

10. The sandwich structure of claim 1, further comprising:
a temperature management system mounted within the sandwich structure and being configured to circulate coolant for absorbing heat of the sandwich structure.

11. The sandwich structure of claim 1, wherein the sandwich structure forms at least one of the following:
an engine exhaust nozzle;
a thermal protection system; and
an attachment between a tank and a structure.

12. An engine exhaust nozzle, comprising:
a sandwich structure having a closed cross-section and including:
a first skin and a second skin arranged on top of one another and separated from one another by a hinge assembly sandwiched between the first and second skin, the hinge assembly including:
a first hinge member and a second hinge member each being configured as at least one of the following: a bar, and a shear panel;
the first hinge member having a proximal end movably coupled to the first skin at a first skin joint;
the second hinge member having a proximal end movably coupled to the second skin at a second skin joint;
the first hinge member extending outwardly at a non-perpendicular angle from the first skin and terminating at a distal end;
the second hinge member extending outwardly at a non-perpendicular angle from the second skin and terminating at a distal end;
the distal end of the first hinge member being movably coupled to the distal end of the second hinge member at a member joint located between the first and second skin; and
a plurality of movable joints connecting the proximal end of the first and second hinge member respectively to the first and second skin, and the member joint connecting the distal ends of the first and second hinge member to one another, the plurality of movable joints and the member joint being configured as hinged couplings including at least one of the following: a universal joint, a ball and socket, a clevis fitting, and a pivoting hinge;
the first skin is expandable relative to the second skin in a circumferential direction of the sandwich structure, the circumferential direction circumscribing a central axis;
the first and second hinge member moving in response to expansion of the first skin relative to second skin in the circumferential direction;
the first skin moving relative to the second skin in a radial direction in response to expansion of the first skin relative to the second skin in the circumferential direction;
the hinge assembly preventing movement of the first skin relative to the second skin in the circumferential direction while:
allowing movement of the first skin relative to the second skin in the radial direction; and
allowing movement of the first skin relative to the second skin in a longitudinal direction, the longitudinal direction being parallel to the central axis.

13. A method of minimizing loads in a sandwich structure, comprising the steps of:
providing a first skin and a second skin arranged on top of one another and being separated from one another by a hinge assembly sandwiched between the first and second skin to form the sandwich structure having a closed cross-section defining a central axis, the hinge assembly comprising:
a first hinge member and a second hinge member each being configured as at least one of the following: a bar, and a shear panel;
the first hinge member having a proximal end movably coupled to the first skin at a first skin joint;
the second hinge member having a proximal end movably coupled to the second skin at a second skin joint;
the first hinge member extending outwardly at a non-perpendicular angle from the first skin and terminating at a distal end;
the second hinge member extending outwardly at a non-perpendicular angle from the second skin and terminating at a distal end;
the distal end of the first hinge member being movably coupled to the distal end of the second hinge member at a member joint between the first and second skin; and
a plurality of movable joints connecting the proximal end of the first and second hinge member respectively to the first and second skin, and the member joint connecting the distal end of the first and second hinge member to one another, the plurality of movable joints and the member joint being configured as hinged couplings including at least one of the following: a universal joint, a ball and socket, a clevis fitting, and a pivoting hinge;
expanding the first skin relative to the second skin in a circumferential direction of the sandwich structure, the circumferential direction circumscribing the central axis;
moving the first and second hinge member in response to expanding the first skin relative to second skin in the circumferential direction;
moving the first skin relative to the second skin in a radial direction in response to expansion of the first skin, relative to the second skin in the circumferential direction; and
preventing rotation of the first skin relative to the second skin in the circumferential direction while:
allowing movement of the first skin relative to the second skin in the radial direction; and
allowing movement of the first skin relative to the second skin in a longitudinal direction, the longitudinal direction being parallel to the central axis.

14. The method of claim 13, wherein the first and second skin joint have a respective first and second axis, the member joint defining a member axis, the method further comprising the step of:
orienting at least two of the following axes in parallel relation to one another; the first axis, the second axis, and the member axis.

15. The method of claim 13, further comprising the step of:
forming at least one of the first and second hinge member as a triangular subassembly comprised of at least two bars;
the at least two bars having a proximal end and a distal end;
the proximal end of each one of the at least two bars being coupled to a corresponding one of the first and second skin at the corresponding first and second skin joint; and
the distal end of each one of the at least two bars being coupled to one another at the member joint.

16. The method of claim 13, further comprising the step of:
forming each one of the first and second hinge member as a triangular subassembly; and
coupling the triangular subassembly to form a pyramidal assembly.

17. The method of claim 13, wherein the step of expanding the first skin relative to the second skin in the circumferential direction comprises:
expanding the first skin relative to the second skin in response to differentially heating the first and second skin.

18. The method of claim 13, wherein the step of expanding the first skin relative to the second skin in the circumferential direction comprises:
providing at least one of the first and second skin as a wall of a pressurized tank; and
expanding the first skin relative to the second skin in response to a change in an internal pressure of the tank.

19. The method of claim 13, further comprising the step of:
stiffening at least one of the first and second skins using at least one stiffener.

20. The method of claim 13, further comprising the step of:
aligning the hinge member with a deflection trajectory of the first skin; and
the deflection trajectory comprising a direction of movement of the first skin relative to the second skin along the radial direction.

21. The method of claim 13, further comprising the step of:
circulating coolant through a temperature management system mounted within the sandwich structure.

22. A method of operating an aircraft engine, comprising the steps of:
providing au aircraft engine including a closed cross-section nozzle having a sandwich structure comprising a first skin and a second skin arranged on top of one another and being separated from one another by a hinge assembly sandwiched between the first and second skin, the hinge assembly comprising:
a first hinge member and a second hinge member each being configured as at least one of the following: a bar, and a shear panel;
the first hinge member having a proximal end movably coupled to the first skin at a first skin joint;
the second hinge member having a proximal end movably coupled to the second skin at a second skin joint;
the first hinge member extending outwardly at a non-perpendicular angle from the first skin and terminating at a distal end;
the second hinge member extending outwardly at a non-Perpendicular angle from the second skin and terminating at a distal end;
the distal end of the first hinge member being movably coupled to the distal end of the second hinge member at a member joint located between the first and second skin; and a plurality of movable joints connecting the proximal end of the first and second hinge member respectively to the first and second skin, and the member joint connecting the distal end of the first and second hinge member to one another, the plurality of movable joints and the member joint being configured as hinged couplings including at least one of the following: a universal joint, a ball and socket, a clevis fitting, and a pivoting hinge;

operating the aircraft engine causing the first skin to expand relative to the second skin in a circumferential direction of the sandwich structure and causing movement of the member joint in a radial direction, the circumferential direction circumscribing a central axis; and moving the first and second hinge member in response to expansion of the first skin relative to second skin in the circumferential direction;

moving the first skin relative to the second skin in the radial direction as a result of expansion of the first skin relative to the second skin in the circumferential direction;

preventing movement of the first skin relative to the second skin in the circumferential direction while:
allowing movement of the first skin relative to the second skin in the radial direction; and
allowing movement of the first skin relative to the second skin in a longitudinal direction, the longitudinal direction being parallel to the central axis.

23. A method of fabricating a sandwich structure, comprising the steps of:
providing a first skin and a second skin arranged on top of one another and separated from one another by a hinge assembly sandwiched between the first and second skin forming the sandwich structure having a closed cross-section, the hinge assembly comprising:
a first hinge member and a second hinge member each being configured as at least one of the following; a bar, and a shear panel;
the first hinge member having a proximal end movably coupled to the first skin at a first skin joint;
the second hinge member having a proximal end movably coupled to the second skin at a second skin joint;
the first hinge member extending outwardly at a non-perpendicular angle from the first skin and terminating at a distal end;
the second hinge member extending outwardly at a non-perpendicular angle from the second skin and terminating at a distal end; and
the distal end of the first hinge member being movably coupled to the distal end of the second hinge member at a member joint located between the first and second skin;
a plurality of movable joints connecting the proximal end of the first and second hinge member respectively to the first and second skin, and the member joint connecting the distal end of the first and second hinge member to one another, the plurality of movable joints and the member joint being configured as hinged couplings including at least one of the following: a universal joint, a ball and socket, a clevis fitting, and a pivoting hinge;
the first skin is expandable relative to the second skin in a circumferential direction of the sandwich structure, the circumferential direction circumscribing a central axis;
the first and second hinge meaner being movable in response to expansion of the first skin relative to second skin in the circumferential direction;
the first skin being movable relative to the second skin in a radial direction in response to expansion of the first skin relative to the second skin in the circumferential direction;
the hinge assembly preventing movement of the first skin relative to the second skin in the circumferential direction while:
allowing movement of the first skin relative to the second skin in the radial direction; and,
allowing movement of the first skin relative to the second skin in a longitudinal direction, the longitudinal direction being parallel to the central axis.

* * * * *